(12) United States Patent
Tanaka et al.

(10) Patent No.: US 8,798,465 B2
(45) Date of Patent: Aug. 5, 2014

(54) OPTICAL PATH SWITCHING SIGNAL TRANSMISSION/RECEPTION APPARATUS AND CORRESPONDING METHOD

(75) Inventors: Norio Tanaka, Tokyo (JP); Shigeru Takarada, Tokyo (JP); Hirobumi Watanabe, Kawasaki (JP); Shiro Futaki, Yokohama (JP); Ichiro Ueno, Isehara (JP); Takashi Hiraga, Ikeda (JP); Noritaka Yamamoto, Ikeda (JP)

(73) Assignees: Dainichiseika Color & Chemicals Mfg. Co., Ltd., Tokyo (JP); Inter Energy Co., Ltd., Kawasaki-shi (JP); National Institute of Advanced Industrial Science and Technology, Tokyo (JP)

( * ) Notice: Subject to any disclaimer, the term of this patent is extended or adjusted under 35 U.S.C. 154(b) by 353 days.

(21) Appl. No.: 13/264,654

(22) PCT Filed: Apr. 14, 2010

(86) PCT No.: PCT/JP2010/056961
§ 371 (c)(1),
(2), (4) Date: Nov. 21, 2011

(87) PCT Pub. No.: WO2010/119981
PCT Pub. Date: Oct. 21, 2010

(65) Prior Publication Data
US 2012/0063777 A1  Mar. 15, 2012

(30) Foreign Application Priority Data
Apr. 16, 2009 (JP) .................. 2009-099526

(51) Int. Cl.
*H04J 14/00* (2006.01)
(52) U.S. Cl.
USPC ................... 398/45; 398/47; 398/48; 398/49; 398/50; 398/51; 398/52; 398/54; 385/16
(58) Field of Classification Search
USPC .................... 398/45–51; 385/15–22; 359/320
See application file for complete search history.

(56) References Cited

U.S. PATENT DOCUMENTS 5,802,222 A * 9/1998 Rasch et al. ............... 385/1
7,054,265 B1 * 5/2006 Sugawara et al. .......... 370/225
(Continued)

FOREIGN PATENT DOCUMENTS

CN   101321017 A   12/2008
JP   A-2000-121865   4/2000
(Continued)

OTHER PUBLICATIONS

May 28, 2013 Japanese Office Action issued in Japanese Patent Application No. 2009-099526 (with translation).

(Continued)

*Primary Examiner* — Li Liu
(74) *Attorney, Agent, or Firm* — Oliff PLC

(57) ABSTRACT

An optical path switching type optical signal transmission/reception apparatus includes a one-to-seven compatible optically controlled optical path switching apparatus 100 that is connected to a host optical signal transmission/reception apparatus 1 via an optical fiber, a total of seven subordinate optical communication adapters 110 connected via optical fibers, user side devices 160 connected to respective subordinate optical communication adapters via an electric circuit, an optical transmission/reception control circuit provided in each of the total of seven subordinate user side optical communication adapters 110, and including an uplink optical signal transmission mechanism, a downlink optical signal reception mechanism, a control light source that can generate control light to drive the optical path switching apparatus 100, in which a wavelength of the generated control light is different from a wavelength of signal light, and an optical communication oriented transmission/reception mechanism using the wavelength of the control light source, optical paths 1211 to 1216 dedicated to the control light to connect the optical path switching apparatus 100 to the seven user side optical communication adapters 110, and a reflection-type star coupler.

21 Claims, 9 Drawing Sheets

(56) References Cited

U.S. PATENT DOCUMENTS

| | | | |
|---|---|---|---|
| 2005/0248844 A1 | 11/2005 | Ueno et al. | |
| 2007/0159682 A1* | 7/2007 | Tanaka et al. | 359/320 |
| 2008/0069504 A1* | 3/2008 | Hiraga et al. | 385/106 |
| 2008/0304828 A1 | 12/2008 | Mizutani et al. | |
| 2009/0022453 A1* | 1/2009 | Ueno et al. | 385/16 |
| 2010/0158527 A1 | 6/2010 | Mizutani et al. | |
| 2010/0245960 A1 | 9/2010 | Ueno et al. | |
| 2011/0008041 A1* | 1/2011 | Uchiyama et al. | 398/30 |
| 2011/0026926 A1* | 2/2011 | Yamashita | 398/79 |

FOREIGN PATENT DOCUMENTS

| | | |
|---|---|---|
| JP | A-2000-152291 | 5/2000 |
| JP | B2-3809908 | 8/2006 |
| JP | A-2007-225825 | 9/2007 |
| JP | A-2007-225826 | 9/2007 |
| JP | A-2007-255827 | 9/2007 |
| JP | B2-3972066 | 9/2007 |
| JP | A-2008-76685 | 4/2008 |
| JP | A-2008-83095 | 4/2008 |
| JP | A-2008-148092 | 6/2008 |
| JP | A-2010-176008 | 8/2010 |

OTHER PUBLICATIONS

Aug. 2, 2012 European Office Action issued in Application No. 10 716 904.7.

Dec. 4, 2013 Office Action issued in Chinese Patent Application No. 201080016589.4 (with translation).

Jung, H. D. et al., "All-optical Routing Architecture of Radio Signals using Label Processing Technique for In-building Optical Networks," IEEE, 2008, vol. 2, pp. 197-198.

International Search Report issued in International Application No. PCT/JP2010/056961 dated Oct. 7, 2010.

Written Opinion of International Searching Authority issued in International Application No. PCT/JP2010/056961 dated Oct. 7, 2010.

* cited by examiner

OPTICAL PATH SWITCHING SIGNAL TRANSMISSION/RECEPTION APPARATUS AND CORRESPONDING METHOD

TECHNICAL FIELD

The present invention relates to an optical path switching type optical signal transmission/reception apparatus and a relevant optical signal transmission/reception method that can perform switching of the optical path using a thermal lens type optically controlled optical path switching switch, which can be used in the field of optical electronics as well as in the field of photonics, such as optical communications and optical information processing.

BACKGROUND ART

The inventors of the present application have invented an optical path switching apparatus and a relevant method based on a new principle (see patent literature 1). The invented optical path switching apparatus is configured to irradiate a control light absorbing area of a thermal lens forming element with control light in a wavelength band that can be absorbed by the control light absorbing area and signal light in a wavelength band that cannot be absorbed by the control light absorbing area in such a manner that optical axes of the control light and the signal light coincide with each other when the control light and the signal light converge. According to the above-described configuration, irradiation of the control light can be selectively performed when the control light absorbing area of the thermal lens forming element is irradiated with the signal light. More specifically, in a case where irradiation of the control light and irradiation of the signal light are not simultaneously performed, the signal light passes through a hole of a mirror and travels straight. On the other hand, in a case where irradiation of the control light and irradiation of the signal light are simultaneously performed, the signal light is reflected by the mirror that is inclined relative to the traveling direction of the signal light. In other words, the optical path of the signal light is changed by the mirror. In this respect, the patent literature 1 discloses an optically controlled optical path switching apparatus that can switch the traveling direction of the signal light between two directions using the control light having only one type of wavelength.

Further, the inventors of the present application have invented an optically controlled optical path switching type optical signal transmission apparatus and a relevant optical signal optical path switching method, in which a plurality of thermal lens forming elements are combined with hole-formed mirrors (see patent literature 2). According to the invented optical path switching type optical signal transmission apparatus, a wavelength band that can be absorbed by a control light absorbing area and a wavelength of control light are in a one to one relationship. Further, the invented optical path switching type optical signal transmission apparatus uses a combination of a total of seven thermal lens forming elements, which have three types of control light absorbing areas, for example, pigments used for which are different in absorbing wavelength band. In addition, the invented optical path switching type optical signal transmission apparatus realizes an optically controlled switching system capable of distributing data of a server to eight destinations by ON-OFF controlling the control light having three types of wavelengths.

Further, as disclosed in patent literatures 3 to 6, the inventors of the present application have further proposed another optical path changing methods and optical path switching apparatuses.

According to the proposed optical path changing methods and the optical path switching apparatuses, emission of control light in a wavelength band that can be absorbed by the control light absorbing area and emission of signal light in a wavelength band that cannot be absorbed by the control light absorbing area are performed so as to let both the lights enter into a control light absorbing area of a thermal lens forming optical element and converge in the control light absorbing area. In this case, a light convergence point of the control light is differentiated from a light convergence point of the signal light. Therefore, both the control light and the signal light converge on an incidence plane of the control light absorbing area or its vicinity in the light traveling direction, and then diffuse respectively. As a result, in the control light absorbing area, the temperature increases locally in the area where the control light is absorbed and its peripheral area. According to the above-described increase in temperature, the structure of the thermal lens changes reversibly. The refractive index substantially changes, and the traveling direction of the signal light changes correspondingly.

Each of the patent literatures 4 and 5 discloses a one-to-two compatible optically controlled optical path switching apparatus that can switch the traveling direction of control light to one of two directions using control light having a single wavelength. Further, the patent literature 6 discloses an optically controlled optical path switching apparatus that can switch the optical path of signal light to be emitted from a central fiber of an end face closely-arranged seven-core optical fiber to one of, for example, seven directions, using control light that can be emitted from six optical fibers provided around the central fiber. In the following description, the optically controlled optical path switching apparatus discussed in the patent literature 6 is referred to as "one-to-seven compatible optically controlled optical path switching apparatus." Further, patent literature 7 discloses an end face closely-arranged multi-core optical fiber and its manufacturing method, which can be used for the one-to-seven compatible optically controlled optical path switching apparatus.

Patent literature 8 discloses, in FIG. 5, a "reflection-type star coupler" that includes a plurality of optical fibers or optical waveguides bound together to form an integrated optical path of the optical fibers or the integrated optical waveguide and a total reflection mirror provided at an end face of the integrated optical path. The above-described reflection-type star coupler can be used to constitute a "reflection-type star coupler based optical LAN" that can receive an optical signal transmitted from an optical transmission/reception apparatus, which is connected to respective optical fibers or optical waveguides, and can uniformly distribute the optical signal to a plurality of optical transmission/reception apparatuses. However, according to the above-described optical LAN, it is necessary to additionally use a time division multiplexing or wavelength division multiplexing control technique to prevent any collision between optical signals transmitted from a plurality of optical transmission/reception apparatuses.

In view of the widespread use of the Internet conformable to the communication standard "TCP/IP protocol" and the necessity of handling massive communication data, and further as a prospective communication means replaceable with the old-fashioned current telephone circuit network, there is a recent movement, so-called "Fiber To The Home (FTTH)", which introduces optical fibers to general houses. To this end, optical fiber networks that are adapted to wavelength multiplex optical communication specifications are widely built and operated in individual houses for the FTTH. Utilization of the FTTH system is useful to promote an advanced communication environment, i.e., so-called "triple play", which can provide three types of services "Internet communications", "IP packet telephones", and "audio/visual (AV) distributions." In this case, a wavelength division multiplexing optical communication technique is practically employable to transmit three types of optical communication signals via one optical fiber. More specifically, as illustrated in FIG. 8, various signal lights are presently used for "Internet communications" and "IP packet telephones." The signal light to be used for an "uplink optical signal" transmitted from each user side device to a station building apparatus is signal light in a wavelength range from 1260 nm to 1360 nm (having a central wavelength of 1310 nm). The signal light to be used for a "downlink optical signal" transmitted from the station building apparatus to each user side device is signal light in a wavelength range from 1480 nm to 1500 nm (having a central wavelength of 1490 nm). Further, the signal light to be used for distribution of AV signals from the station building apparatus to each user side device is signal light having a wavelength of 1550 nm.

Patent Literature 1: JP 3809908 B
Patent Literature 2: JP 3972066 B
Patent Literature 3: JP 2007-225825 A
Patent Literature 4: JP 2007-225826 A
Patent Literature 5: JP 2007-225827 A
Patent Literature 6: JP 2008-083095 A
Patent Literature 7: JP 2008-076685 A
Patent Literature 8: JP 2000-121865 A

SUMMARY OF THE INVENTION

Technical Problem

An object of the present invention is to attain a goal of saving power consumption in an in-house optical signal transmission/reception apparatus that performs conversions between optical signals and electric signals in a user's house equipped with an optical fiber connected to an Internet network. More specifically, the present invention can substantially reduce "standby electric power" (i.e., electric power that is consumed when no communication is performed) to zero in an environment where electric power is consumed regardless of presence of communications. The sum of electric power consumptions in in-house communication devices (e.g., an in-house optical signal transmission/reception apparatus, a hub, a rooter, and a wireless LAN apparatus) is approximately in a range from 7 W to 40 W per house. If the number of FTTH equipped houses reaches to 20,000,000 houses, the total consumption of electric power is approximately in a range from 140,000 kW to 800,000 kW. In a case where the actual usage time of the in-house communication devices is four hour per day (24 hours), the waiting time is 20 hours. The standby electric power increases up to a level in a range from 2,800,000 kWh/day to 16,000,000 kWh/day. In view of the foregoing, the present invention intends to reduce the above-described large amount of useless standby electric power to substantially zero by utilizing optical techniques.

Solution to Problem

To attain the above-described objects, the present invention provides an optical path switching type optical signal transmission/reception apparatus having the following configuration and a relevant method for switching the optical path of an optical signal.

(1) An optical path switching type optical signal transmission/reception apparatus according to an embodiment of the present invention includes:
a host optical signal transmission/reception apparatus;
a one-to-N compatible optically controlled optical path switching apparatus connected to the host optical signal transmission/reception apparatus via a first optical path constructed by an optical fiber or an optical waveguide;
a total of N subordinate optical communication adapters connected to the one-to-N compatible optically controlled optical path switching apparatus via second optical paths constructed by an optical fiber or an optical waveguide and configured to transmit and receive signal light to and from the one-to-N compatible optically controlled optical path switching apparatus via the second optical paths;
user side devices connected to the total of N subordinate optical communication adapters via an electric circuit;
an optical transmission/reception control circuit provided in each of the total of N subordinate optical communication adapters, and including at least an uplink optical signal transmission mechanism, a downlink optical signal reception mechanism, and a control light source that can generate control light to drive the one-to-N compatible optically controlled optical path switching apparatus, in which a wavelength of the generated control light is different from a wavelength of the signal light;
third optical paths dedicated to the control light and constructed by an optical fiber or an optical waveguide to connect the one-to-N compatible optically controlled optical path switching apparatus and the total of N subordinate optical communication adapters; and
a subordinate data transmission/reception inter-apparatus bidirectional communication unit configured to transmit, to another subordinate optical communication adapter, information indicating a state where the control light is transmitted from the optical transmission/reception control circuit of one subordinate optical communication adapter, in which the control light serves to open one of the second optical paths that connects the one subordinate optical communication adapter to the host optical signal transmission/reception apparatus, and further configured to prevent any conflict of control lights,
wherein the numerical value N is an integer that is equal to or greater than 2.

(2) In the above-described optical path switching type optical signal transmission/reception apparatus (1), the subordinate data transmission/reception inter-apparatus bidirectional communication unit is constructed as a reflection-type star coupler based optical LAN that includes:
an optical communication oriented transmission/reception mechanism provided in each of the total of N subordinate optical communication adapters and using the wavelength of the control light supplied from the control light source;
a plurality of distributors provided on respective optical paths, which are constructed by an optical fiber or an optical waveguide to transmit the control light that connects the one-to-N compatible optically controlled optical path switching apparatus to the total of N subordinate optical communication adapters;

a multiplexer that binds a total of N fourth optical paths, which extend from respective distributors and are constructed by an optical fiber or an optical waveguide, and a mirror provided at a bound output terminal of the multiplexer.

(3) In the above-described optical path switching type optical signal transmission/reception apparatus (1), in a case where the numerical value N is 7, a one-to-seven compatible thermal lens type optically controlled optical path switching apparatus is used to switch an optical path of signal light to be emitted from a central fiber of an end face closely-arranged seven-core optical fiber to one of seven directions by using control light that can be emitted from any one of six optical fibers provided around the central fiber.

(4) In the above-described optical path switching type optical signal transmission/reception apparatus (2), in a case where the numerical value N is 7, a one-to-seven compatible thermal lens type optically controlled optical path switching apparatus is used to switch an optical path of signal light to be emitted from a central fiber of an end face closely-arranged seven-core optical fiber to one of seven directions by using control light that can be emitted from any one of six optical fibers provided around the central fiber.

(5) In the above-described optical path switching type optical signal transmission/reception apparatus (3) or (4), the one-to-seven compatible optically controlled optical path switching apparatus includes a thermal lens forming element having a signal light transmitting/control light absorbing layer, and a control light emission side optical path and a signal light receiving side optical path are seven-core optical fibers.

(6) In the above-described optical path switching type optical signal transmission/reception apparatuses (1) to (5), uplink signal light transmitted from the one-to-N compatible optically controlled optical path switching apparatus or one-to-seven compatible optically controlled optical path switching apparatus to the host optical signal transmission/reception apparatus is light having a wavelength in a range from 1260 nm to 1360 nm, downlink signal light transmitted from the host optical signal transmission/reception apparatus to the one-to-N compatible optically controlled optical path switching apparatus or one-to-seven compatible optically controlled optical path switching apparatus is light having a wavelength in a range from 1480 nm to 1500 nm, and the control light is light having a wavelength in a range from 980 nm to 1250 nm.

(7) An apparatus according to another embodiment of the present invention includes a combination of an optically controlled optical path switching type optical signal transmission/reception apparatus and a reflection-type star coupler based bidirectional optical communication apparatus that uses a part of control light to drive the optically controlled optical path switching apparatus. The apparatus includes:

a host optical signal transmission/reception apparatus;

a one-to-seven compatible optically controlled optical path switching apparatus connected to the host optical signal transmission/reception apparatus via a first optical path constructed by an optical fiber or an optical waveguide;

a total of seven subordinate optical communication adapters connected to the one-to-seven compatible optically controlled optical path switching apparatus via second optical paths constructed by an optical fiber or an optical waveguide and configured to transmit and receive signal light to and from the one-to-seven compatible optically controlled optical path switching apparatus via the second optical paths;

user side devices connected to the total of seven subordinate optical communication adapters via an electric circuit;

an optical transmission/reception control circuit provided in each of the total of seven subordinate user side optical communication adapters, and including at least an uplink optical signal transmission mechanism, a downlink optical signal reception mechanism, a control light source that can generate control light to drive the one-to-seven compatible optically controlled optical path switching apparatus, in which a wavelength of the generated control light is different from a wavelength of the signal light, and an optical communication oriented transmission/reception mechanism using the wavelength of the control light source;

third optical paths dedicated to the control light and constructed by an optical fiber or an optical waveguide to connect the one-to-seven compatible optically controlled optical path switching apparatus and the total of seven subordinate user side optical communication adapters;

a plurality of distributors provided on respective third optical paths dedicated to the control light; and a reflection-type star coupler including a multiplexer that binds fourth optical paths extending from respective distributors and constructed by an optical fiber or an optical waveguide, and a mirror provided at a bound emission terminal of the multiplexer.

(8) In the above-described optical path switching type optical signal transmission/reception apparatuses (2) to (7), no distributor is provided on the third optical path of the control light from a subordinate optical communication adapter connected to a second optical path to which the signal light is emitted in a case where no control light is emitted to the one-to-N compatible optically controlled optical path switching apparatus or the one-to-seven compatible optically controlled optical path switching apparatus, and the control light from the subordinate optical communication adapter is directly connected to the reflection-type star coupler.

(9) An optical signal transmission/reception method according to the present invention is a combination of a method for optically controlling switching of an optical path of signal light to one of a total of N different directions using control light, wherein a wavelength of the signal light is different from a wavelength of the control signal and the signal light has at least one type of wavelength, and a method for performing bidirectional optical communication with the wavelength of the control light by superposing an optical communication signal on the control light, partly distributing the signal light, multiplexing the distributed signal light, and then reflecting the multiplexed signal light with a mirror, wherein, in a case where the numerical value N is an integer that is equal to or greater than 2, when a subordinate optical communication adapter connected to a user side device requests optical communication to be performed via the host optical signal transmission/reception apparatus, the subordinate optical communication adapter performs:

monitoring a communication status of another user in a reflection-type star coupler based optical LAN;

performing synchronization processing for time division multiplexing transmission/reception;

further, checking a time slot for time division multiplexing to transmit an uplink signal to the host optical signal transmission/reception apparatus;

driving a control light source mounted on the subordinate optical communication adapter according to the time slot allocated to itself for time division multiplexing;

performing an optical path switching operation to connect an optical path of itself to an optically controlled optical path switching apparatus that switches the optical path of the signal light having at least one type of wavelength different from that of the control light to one of a total of N different directions;

transmitting a sync signal to another subordinate optical communication adapter;

transmitting the uplink signal to the host optical signal transmission/reception apparatus, together with an identification code given to the uplink signal for a corresponding returning/downlink signal; and meanwhile, receiving a downlink signal from the host optical signal transmission/reception apparatus, deciphering the received downlink signal, determining a user house addressing signal and an identification code of an in-house user side device, transmitting a signal addressed to itself to a user side device connected to itself, and distributing a signal addressed to another in-house user side device, via a control light source, to a corresponding user side device connected to the reflection-type star coupler based optical LAN.

Advantageous Effects of the Invention

The optical path switching type optical signal transmission/reception apparatus and the optical signal transmission/reception method according to the present invention bring the following effects.

First, only when any one of a plurality of user side devices performs optical communication, electric power is supplied to an E/O converting apparatus, an O/E converting apparatus, and a laser light source of the corresponding subordinate optical communication adapter apparatus. No electric power is consumed for optical communication in a time band where no optical communication is performed. More specifically, the present invention can provide an in-house optical communication system capable of reducing standby electric power to substantially zero.

Second, even in a case where any one of the user side devices is switched to an optical path connected to the host and occupies the optical path to transmit an uplink optical communication signal, downlink optical signals are constantly received and a downlink signal addressed to another user is re-distributed via an optical LAN using the wavelength of the control light. Therefore, the present invention can prevent a specific user from occupying the downlink optical communication.

Third, a transmission status of the control signal supplied to another user side device is monitored, and the control light and an uplink signal supplied to the host apparatus are transmitted in a time slot allocated to itself for time division multiplexing that is synchronized with a slot for another user. Therefore, the present invention can prevent the control light from colliding with an uplink signal transmitted to the host apparatus.

REFERENCES SIGNS LIST

Figure 1:
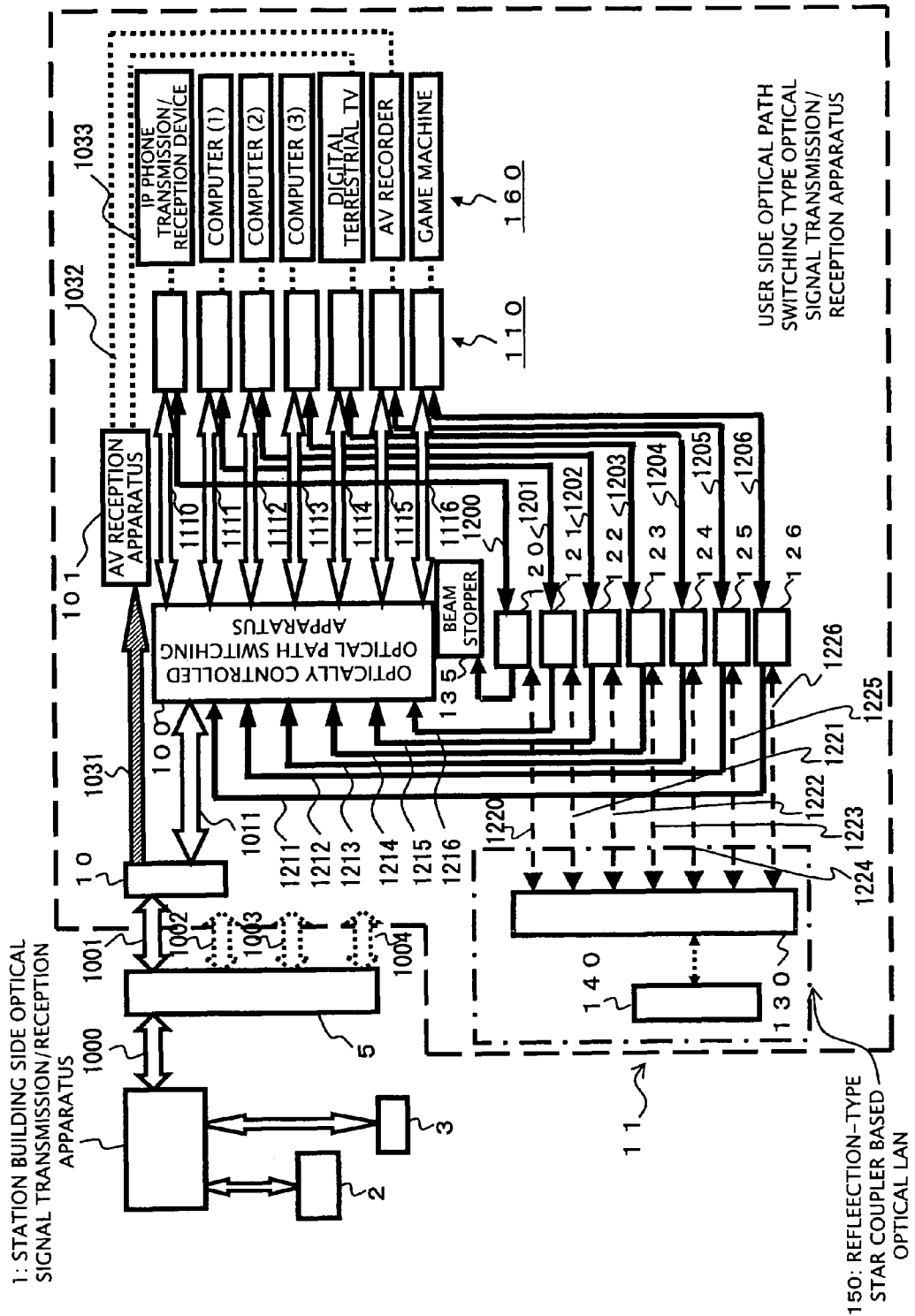
FIG. 1 is a block diagram illustrating a configuration of an optical path switching type optical signal transmission/reception apparatus according to a first embodiment of the present invention.

1: host (station building side) optical signal transmission/reception apparatus, 2: Internet network, 3: digital audio visual (AV) server, 5: distributor, 10: demultiplexer, 11, 12: user side optical path switching type optical signal transmission/reception apparatus, 100: optically controlled optical path switching apparatus, 101: digital audio visual (AV) reception apparatus, 110: subordinate optical communication adapter, 120 to 126 distributors, 130: multiplexer, 135: beam stopper, 140: mirror, 150: reflection-type star coupler based optical LAN, 160: user side device, 1000: optical path of uplink and downlink signal light, 1001 to 1004: optical path of one of distributed downlink signal and uplink signal light, 1011: uplink and downlink signal light demultiplexed from digital audio visual data signal light, 1031: demultiplexed digital audio visual data optical signal, 1032, 1033: electric signal of digital audiovisual data, 1110: optical path of progressive signal light without emission of control light, 1111 to 1116: optical path of uplink and downlink signal light switched to corresponding user side device, 1200 to 1206: optical path of control light supplied from subordinate optical communication adapter to optically controlled optical path switching apparatus and internal signal light (uplink and downlink), 1210 to 1216: optical path of distributed control light supplied from subordinate optical communication adapter to optically controlled optical path switching apparatus, 1220 to 1226: optical path of downlink internal signal light and distributed uplink internal signal light, 1230: optical path of downlink internal signal light and multiplexed uplink internal signal light, 1240: optical path of internal signal light (uplink and downlink) supplied from subordinate optical communication adapter receiving progressive signal light without emission of control light

DESCRIPTION OF THE EMBODIMENTS

Hereinafter, preferred embodiments of the present invention are described below with reference to attached drawings.
[First Embodiment]

An optical path switching type optical signal transmission/reception apparatus and a relevant optical signal transmission/reception method according to a first embodiment of the present invention are described below with reference to FIGS. 1 to 8. In the following description, "an optical path constituted by an optical fiber or an optical waveguide" is simply referred to as an "optical path." Illustrating the propagation of "light" itself is difficult. Therefore, the drawings of the present embodiment illustrate an "optical path defined by a core of an optical fiber" to express the "light" propagating in the optical path. An expression "light and its optical path" may be used in the following description. Further, a host optical signal transmission/reception apparatus according to an embodiment of the present invention is referred to as a "station building side optical signal transmission/reception apparatus."

In the following embodiment, it is assumed that an example value of N is 7 (i.e., N=7). In the case of N=7, an optically controlled optical path switching apparatus 100 is a one-to-seven compatible optically controlled optical path switching apparatus that is described in the patent literature 6. In this case, as described in the patent literature 6, the signal light propagates in a central optical fiber core 400 of the seven-core optical fiber illustrated in FIG. 4. The control light propagates in at least one of six peripheral optical fiber cores 401 to 406. The optically controlled optical path switching apparatus 100 can operate as one-to-two, one-to-three, one-to-four, one-to-five, or one-to-six compatible optically controlled optical path switching apparatuses when the control light propagates in specific one, two, three, four, or five peripheral optical fiber cores of all (i.e., six) peripheral optical fiber cores.

In FIG. 1, a user side optical path switching type optical signal transmission/reception apparatus 11 corresponds to a user side in-house apparatus. A distributor 5 can branch downlink and uplink signal lights. An optical path 1001 is connected to the user side optical path switching type optical signal transmission/reception apparatus 11. Other optical paths 1002, 1003, and 1004 are connected to houses of other users. The distributor 5 is connected to a station building side optical signal transmission/reception apparatus 1 via an optical path 1000. In general, the number of user side optical path switching type optical signal transmission/reception apparatuses 11 that can be simultaneously connected to one station building side optical signal transmission/reception apparatus 1 is 32 to 64.

The distributor 5 is usually a multi-stage type that includes, for example, a combination of a first-stage unit having four distribution terminals and four second-stage units each having eight distribution terminals, thereby realizing a total of 32 distribution terminals.

The station building side optical signal transmission/reception apparatus 1 is connected to an Internet network 2 and an AV server 3, and is configured to perform transmission/reception processing via the Internet network 2 or with the AV server 3.

A demultiplexer 10 receives downlink signal light via the optical path 1001 from the distributor 5, and demultiplexes the received downlink signal light into digital audio visual data signal light 1031 having a wavelength band of 1550 nm and a downlink signal having a central wavelength of 1490 nm. Meanwhile, uplink optical signal light having a central wavelength of 1310 nm can travel in the optical path 1001 via the demultiplexer 10 toward the station building side optical signal transmission/reception apparatus 1. In this case, the uplink optical signal lights of all users are multiplexed by the distributor 5. The multiplexed uplink optical signal light travels in the optical path 1000. The digital audio visual data signal light 1031 is O/E converted and deciphered by an AV reception apparatus 101 and then transmitted as electric signals 1032 and 1033 of digital audio visual data to an AV recorder and a digital terrestrial TV (i.e., user side devices 160).

The optically controlled optical path switching apparatus 100 receives uplink and downlink signal light 1011 demultiplexed from the digital audio visual data signal light 1031, as an optical signal. If all of control lights 1211 to 1216 are not emitted, the optically controlled optical path switching apparatus 100 supplies the received signal light 1011 to an IP phone transmission/reception device (i.e., one of the user side devices 160). If any one of the control lights 1211 to 1216 is emitted, the optically controlled optical path switching apparatus 100 switches the optical path to any one of optical paths 1111 to 1116 that are connected to six (i.e., the second highest and subsequent) subordinate optical communication adapters 110 illustrated in FIG. 1. When the switching of the optical path is completed, any one of six (i.e., the second highest and subsequent) subordinate optical communication adapters 110 illustrated in FIG. 1 can perform "uplink" optical communication with the station building side optical signal transmission/reception apparatus 1. At the same time, the station building side optical signal transmission/reception apparatus 1 can perform "downlink" optical communication with any one of a total of seven subordinate optical communication adapters 110.

Figure 2:
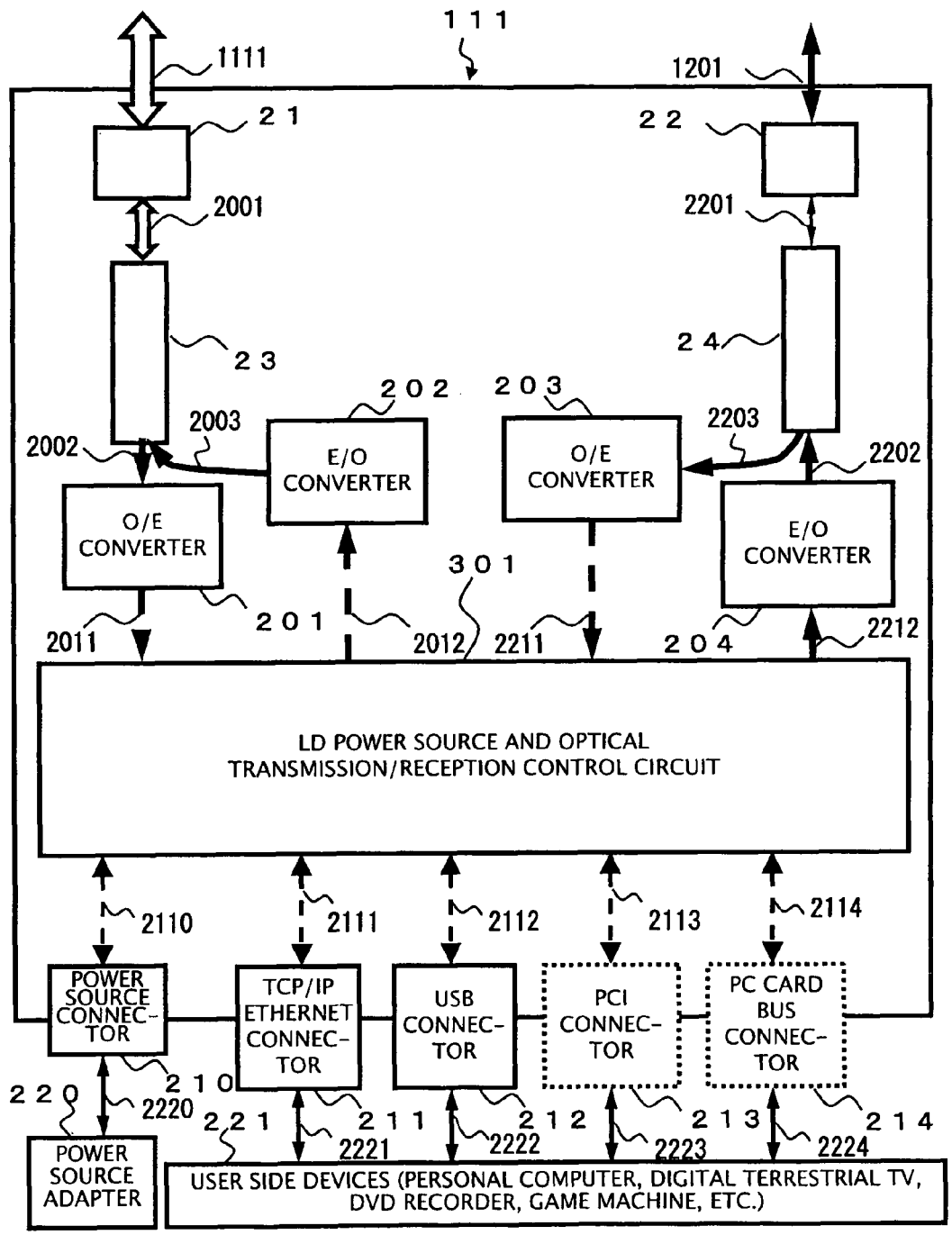
FIG. 2 is a block diagram illustrating a configuration of a subordinate optical communication adapter connected to a user side device, as one of a plurality of subordinate optical communication adapters that can be selectively connected to an optically controlled optical path switching apparatus in the optical path switching type optical signal transmission/reception apparatus according to the first embodiment of the present invention.

FIG. 2 is a block diagram illustrating a subordinate optical communication adapter 111, as a representative example of the second highest and subsequent subordinate optical communication adapters 110 illustrated in FIG. 1, which can be connected to the station building side optical signal transmission/reception apparatus 1 via the optical path by the optically controlled optical path switching apparatus 100 when the control light 1211 is emitted.

Figure 3:
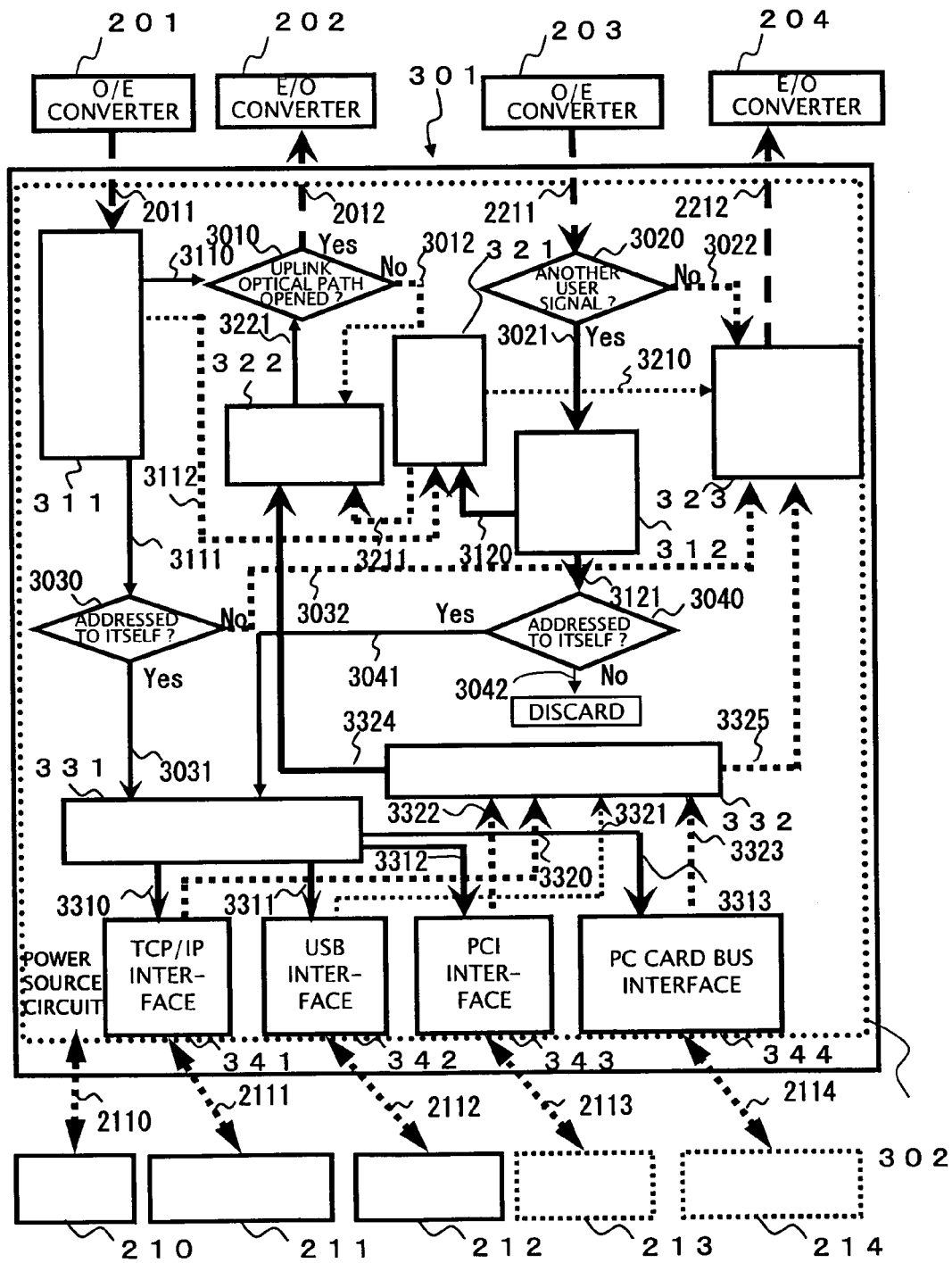
FIG. 3 is a block diagram illustrating a configuration of O/E and E/O converters and an optical signal transmission/reception control circuit in the optical communication adapter that can be connected to a user side device, as one of a plurality of optical communication adapters that can be selectively connected to the optically controlled optical path switching apparatus in the optical path switching type optical signal transmission/reception apparatus according to the first embodiment of the present invention.

FIG. 3 is a block diagram illustrating a detailed arrangement of a laser diode (hereinafter, referred to as "LD") power source and optical transmission/reception control circuit 301 provided in the subordinate optical communication adapter 111.

Figure 4:
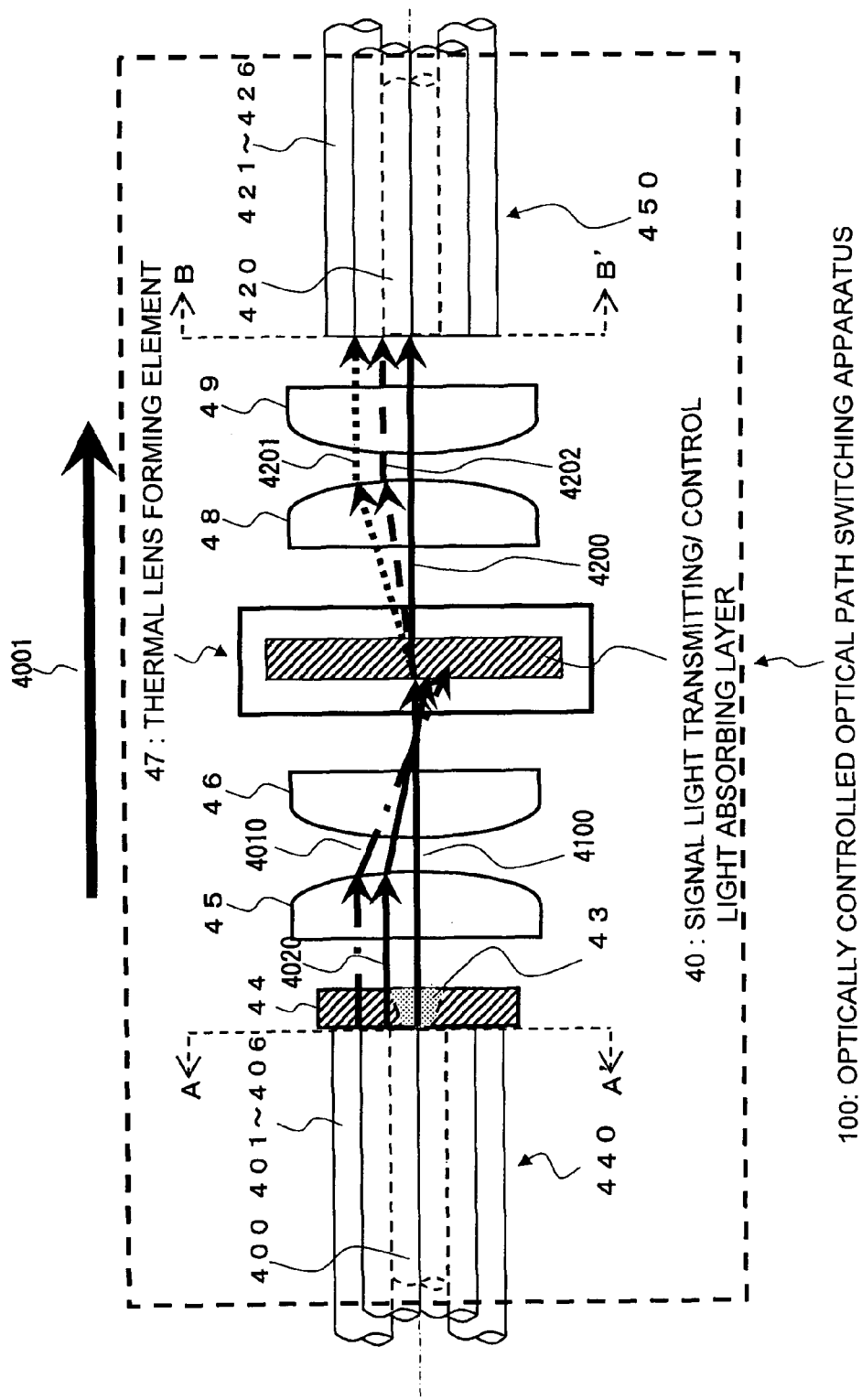
FIG. 4 illustrates a schematic configuration of an example of a circular beam type, one-to-seven compatible optical path switching apparatus that can be used in the first embodiment.

FIG. 4 illustrates a schematic configuration of a circular beam type, one-to-seven compatible optically controlled optical path switching apparatus 100 according to the first embodiment.

Figure 5:
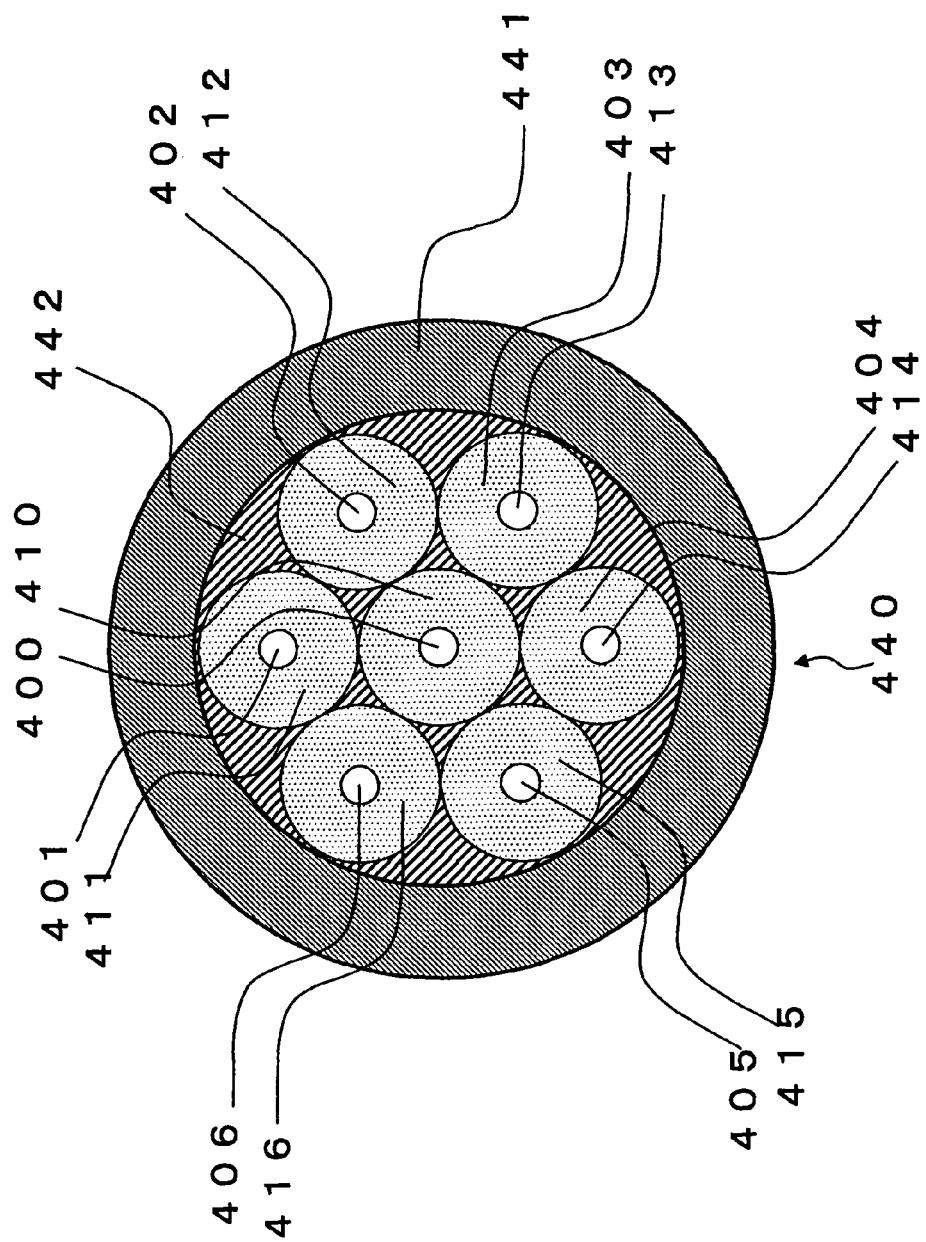
FIG. 5 is a cross-sectional view taken along a line A-A' illustrated in FIG. 4, which is a schematic view illustrating a light emission side end face of a seven-core optical fiber.

FIG. 5 is a cross-sectional view taken along a line A-A' illustrated in FIG. 4, which is a schematic view illustrating a light emission side end face of a control light emission side seven-core optical fiber 440.

Figure 6:
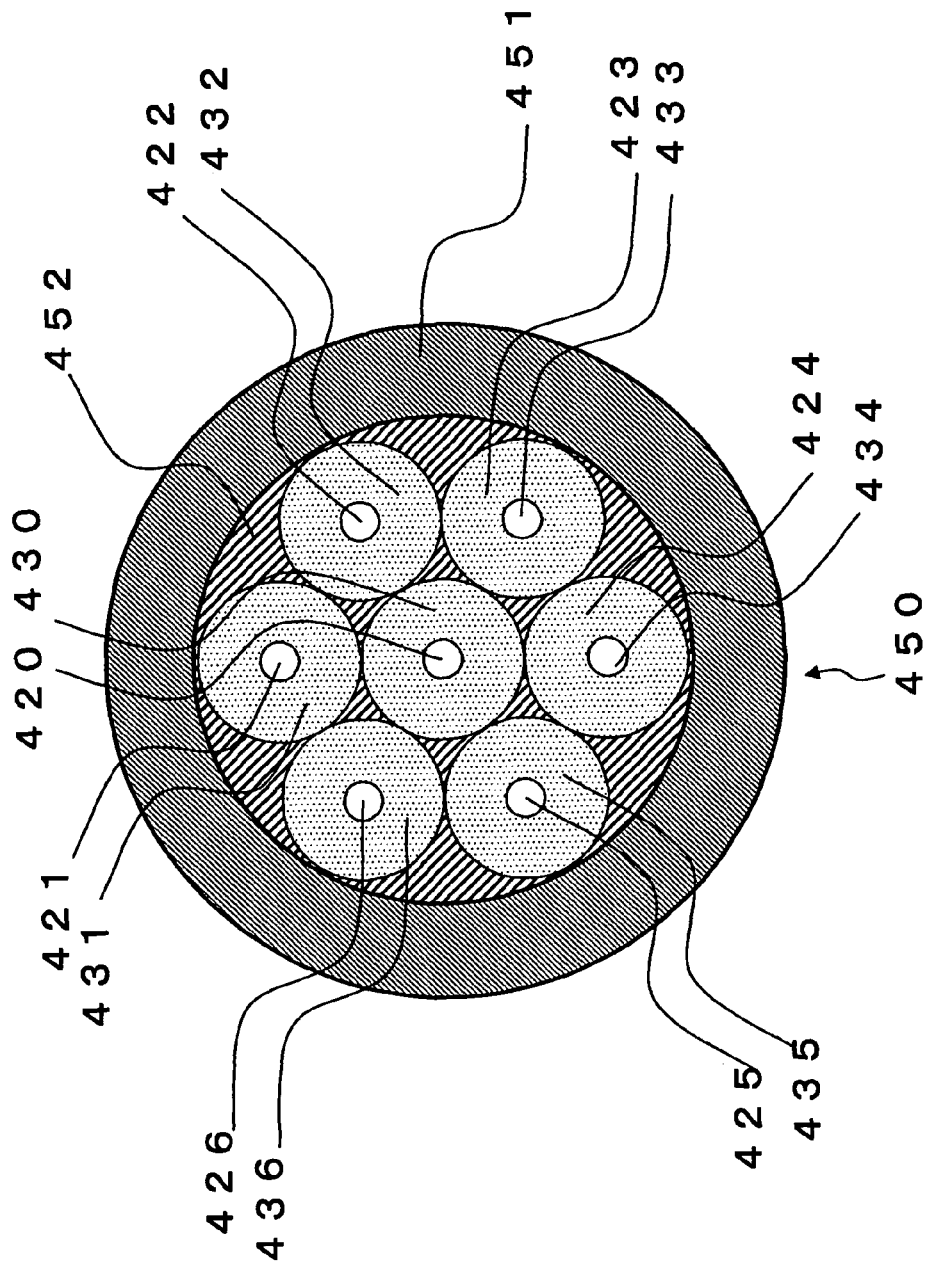
FIG. 6 is a cross-sectional view taken along a line B-B' illustrated in FIG. 4, which is a schematic view illustrating a light-receiving side end face of a seven-core optical fiber.

FIG. 6 is a cross-sectional view taken along a line B-B' illustrated in FIG. 4, which is a schematic view illustrating a light-receiving side end face of a signal light receiving side seven-core optical fiber 450.

Figure 7:
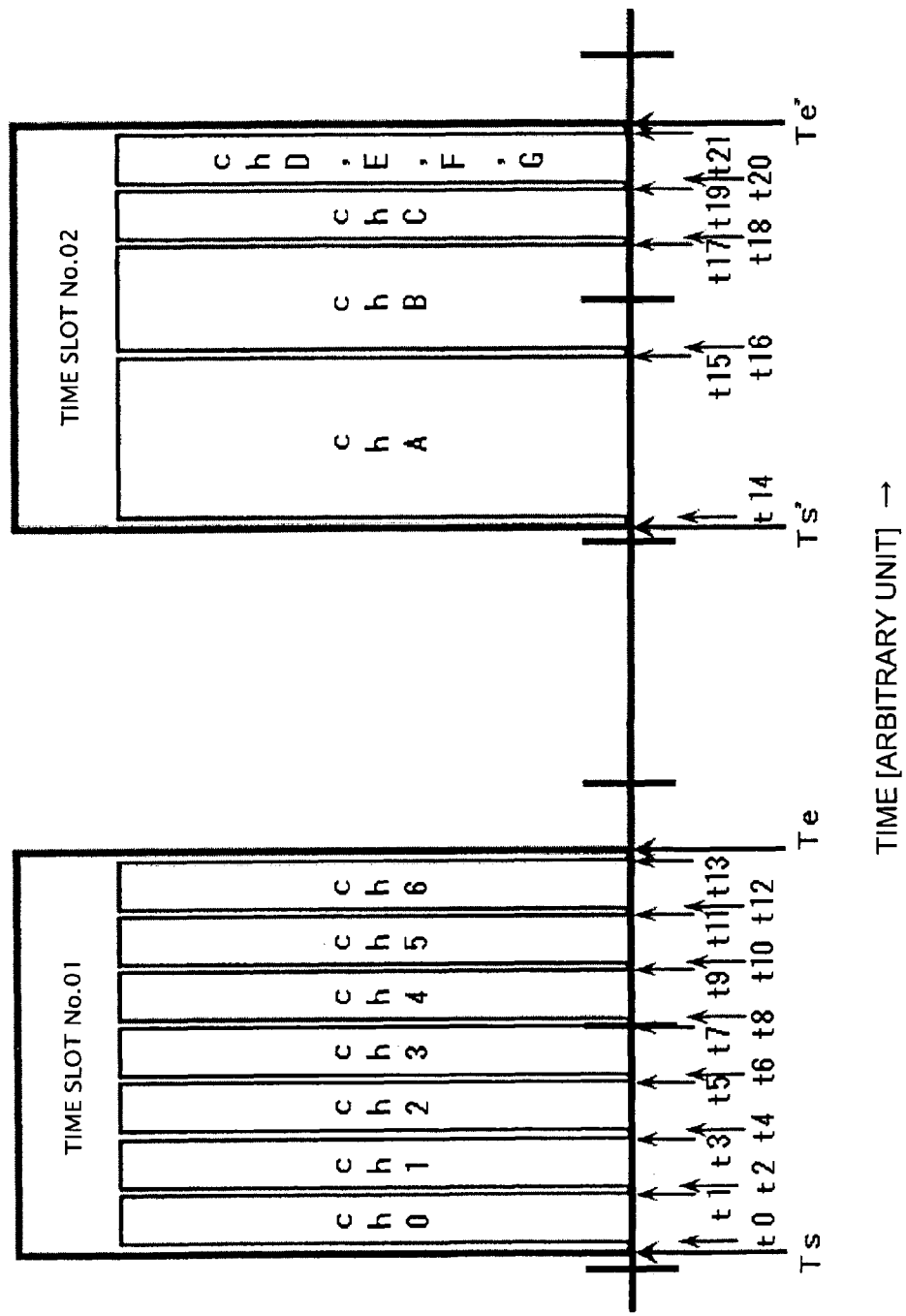
FIG. 7 is a schematic view illustrating a relationship between time slots for an uplink signal having a wavelength of 1310 nm and time slots that are allocated by optical LAN control light.

FIG. 7 is a schematic view illustrating a relationship between time slots for the uplink signal having a wavelength of 1310 nm that are allocated by the station building side optical signal transmission/reception apparatus 1 and time slots for user side devices 160 to 166 that are allocated by a user side in-house optical LAN control system.

Figure 8:
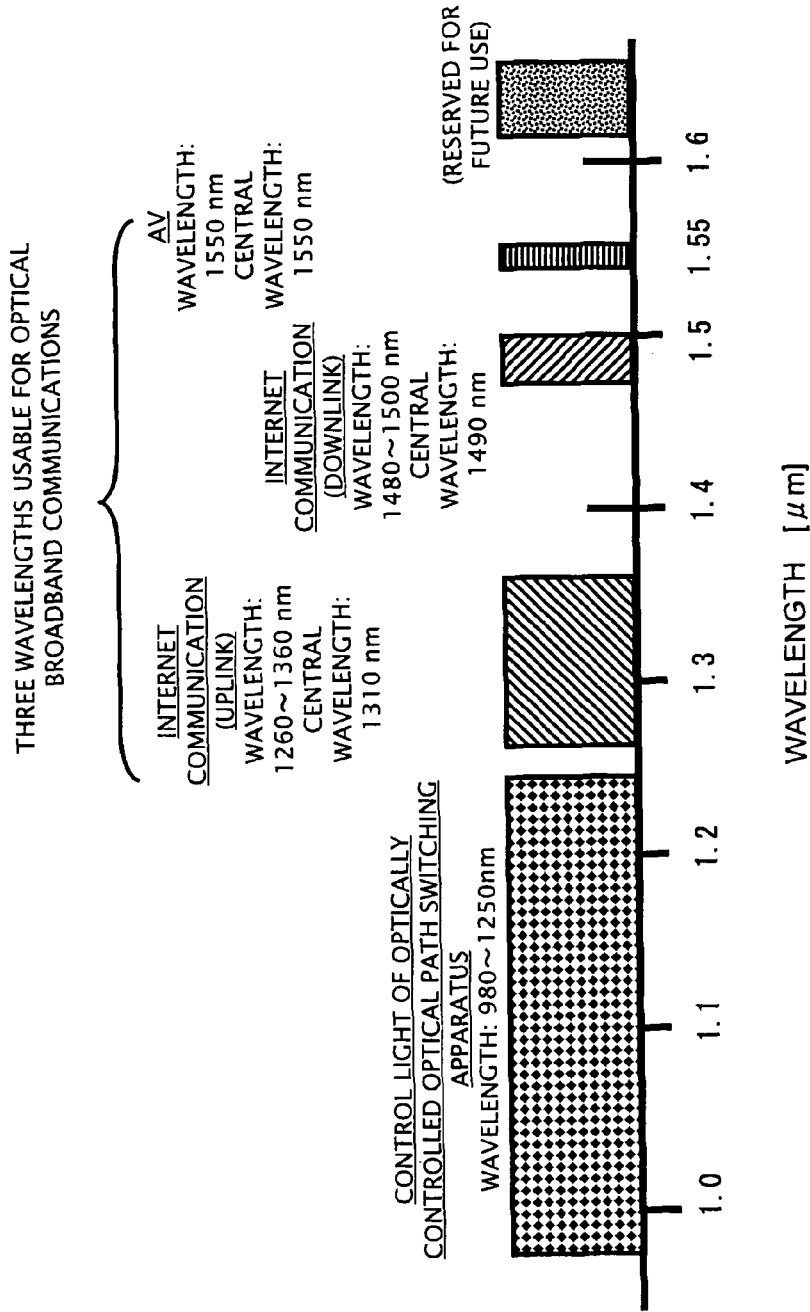
FIG. 8 illustrates a wavelength band that is usable for the control light of the optically controlled optical path switching apparatus and a wavelength band that is usable for optical broadband communications.

FIG. 8 illustrates a wavelength band (980 nm to 1250 nm) that is usable for the control light of the optically controlled optical path switching apparatus 100, and a wavelength band that is usable for optical broadband communications. More specifically, light in a wavelength range from 1260 nm to 1360 nm and having a central wavelength of 1310 nm is usable for an "uplink" optical signal to be transmitted to the station building side optical signal transmission/reception apparatus 1. Light in a wavelength range from 1480 nm to 1500 nm and having a central wavelength of 1490 nm is usable for a "downlink" optical signal. Further, light having a central wavelength of 1550 nm is usable for distribution of AV data.

Constituent components of the user side optical path switching type optical signal transmission/reception apparatus 11 are respectively described below in detail.

The demultiplexer 10 illustrated in FIG. 1 can be any conventional device that can efficiently transmit an uplink optical signal having a central wavelength 1310 nm to the optical path 1001 and can efficiently transmit downlink optical signals having a central wavelength in a range from 1490 nm and 1550 nm, which are selected in wavelength, to the optical paths 1031 and 1011. More specifically, the demultiplexer 10 can be configured to include, for example, a combination of two dichromatic mirrors that selectively reflect optical signals having central wavelengths of 1490 nm and 1550 nm respectively and selectively transmit an optical signal having a central wavelength 1310 nm. Alternatively, the demultiplexer 10 can be configured to include a combination of an optical circulator and a fiber black grating (hereinafter, referred to as "FBG").

As illustrated in FIG. 1 and FIGS. 4 to 6, in the optically controlled optical path switching apparatus 100 according to the first embodiment, the signal light 1011 (i.e., the uplink optical signal having a central wavelength of 1310 nm and the downlink optical signal having a central wavelength of 1490 nm) is emitted from the central core 400 (see FIG. 5) of the control light emission side seven-core optical fiber 440 when all of the control lights 1211 to 1216 are not emitted. Then, the signal light 1011 enters a central core 420 (see FIG. 6) of the signal light receiving side seven-core optical fiber 450, as progressive signal light 4200 illustrated in FIG. 4. Thus, the optical path switching and connection to the subordinate optical-communication adapter 110 via the optical path 1110 can be realized.

As illustrated in FIG. 1 and FIGS. 4 to 6, in the optically controlled optical path switching apparatus 100 according to the first embodiment, the signal light 1011 (i.e., the uplink optical signal having a central wavelength of 1310 nm and the downlink optical signal having a central wavelength of 1490 nm) is emitted from the central core 400 (see FIG. 5) of the control light emission side seven-core optical fiber 440 when any one of the control lights 1211 to 1216 is emitted. The signal light 1011 enters, as optical path changed signal lights 4201 and 4202, into any one of peripheral cores 421 to 426 (see FIG. 6) of the signal light receiving side seven-core optical fiber 450 as illustrated in FIG. 4. Then, the signal lights 4201 and 4202 travel in any one of the optical paths 1111 to 1116 and reach any one of six subordinate optical communication adapters 110 but the top one (i.e., the second highest and subsequent subordinate optical communication adapters 110) illustrated in FIG. 1. Thus, the optical path switching and connection to the subordinate optical communication adapter can be realized. In the present embodiment, the uppermost subordinate optical communication adapter 110 illustrated in FIG. 1 is, for example, connected to the central core 420 of the signal light receiving side seven-core optical fiber 450 illustrated in FIG. 4. The second highest and subsequent subordinate optical communication adapters 110 illustrated in FIG. 1, i.e., the remaining six subordinate optical communication adapters 110, are connected to the peripheral cores 421 to 426 of the signal light receiving side seven-core optical fiber 450 illustrated in FIG. 4.

As illustrated in FIG. 2, in the subordinate optical communication adapter 111 that represents the second highest and subsequent subordinate optical communication adapters 110 illustrated in FIG. 1, signal light 1111 (i.e., the uplink optical signal having a central wavelength of 1310 nm and the downlink optical signal having a central wavelength of 1490 nm) passes through an optical connector 21 and reaches a multiplexer 23 via an optical path 2001.

As illustrated in FIG. 2, the multiplexer 23 multiplexes an uplink optical signal 2003 having a central wavelength of 1310 nm generated from an LD provided in a "wavelength 1310 nm uplink optical signal E/O converter" 202 (which may be simply referred to as "E/O converter" 202 in the following description) with a downlink signal 2002 having a central wavelength 1490 nm transmitted from the station building side optical signal transmission/reception apparatus 1. More specifically, for example, it is useful to use a conventional optical apparatus that incorporates a fiber coupler including two single mode optical fibers mutually fused at their core portions, or a dichromatic mirror that is capable of selectively reflecting light having a central wavelength of 1310 nm and selectively transmitting light having a central wavelength of 1490 nm. A "central wavelength 1490 nm downlink optical signal O/E converter" 201 (which may be simply referred to as "O/E converter" 201 in the following description) converts the downlink signal 2002 having a central wavelength 1490 nm, which is emitted from the multiplexer 23, into an electric signal 2011. The electric signal 2011 is input to the LD power source and the optical transmission/reception control circuit 301. Further, driving power and an uplink signal to be supplied to an LD (not illustrated) provided in the central wavelength 1310 nm uplink optical signal E/O converter 202 are output, as an electric signal 2012, from the LD power source and optical transmission/reception control circuit 301. The electric signal 2012 is transmitted, as the corresponding uplink optical signal 2003 having a central wavelength of 1310 nm, to the station building side optical signal transmission/reception apparatus 1 (i.e., the host apparatus).

As illustrated in FIG. 2, in the subordinate optical communication adapter 111, which is a representative example of the second highest and subsequent subordinate optical communication adapters 110 illustrated in FIG. 1, control light 1201 (e.g., light serving as control light having a wavelength of 980 nm and signal light for bidirectional connection optical LAN to be performed between the subordinate optical communication adapters) passes through an optical connector 22 and travels to an optical signal separation distributor 24 via an optical path 2201.

As illustrated in FIG. 2, the optical signal separation distributor 24 separates an internal uplink optical signal 2202 having a central wavelength 980 nm generated from an LD provided in an internal uplink optical signal E/O converter 204, which also functions as control light having a wavelength of 980 nm, from an internal downlink signal 2203 having a central wavelength of 980 nm of a reflection-type star coupler based optical LAN that is transmitted from a subordinate optical communication adapter (including itself).

More specifically, any one of the following devices can be used as the optical signal separation distributor 24.

(1) Optical Circulator:

In general, an "optical isolator" used in an optical circulator is a device that can transmit light in one direction by using polarization. The optical circulator can be configured by connecting three or more optical isolators in a ring shape, so as to constitute an optically functional element that can transmit the light in one rotational direction and prevent the light from traveling in the reverse direction. The optical circulator can be used to completely separate a signal traveling in the forward direction from a signal traveling in the backward direction even when the signals have the same wavelength. However, the cost of the above-described optical circulator tends to become high because three optical isolators are used.

(2) Combination of Two Optical Isolators and One-to-Two Fiber Coupler:

A connection side optical isolator of a one-to-two fiber coupler is directly connected to the optical path 2201. Two separation side optical isolators of the one-to-two fiber coupler are respectively connected, as "forward direction" and "backward direction", to the optical paths 2202 and 2203 so as to coincide with the light traveling directions illustrated in FIG. 2.

(3) Combination of One-to-Two Fiber Coupler and Electric Processing:

A connection side optical isolator of a one-to-two fiber coupler is directly connected to the optical path 2201. Two separation side optical isolators of the one-to-two fiber coupler are connected to the "internal uplink optical signal E/O converter" 204 (which may be simply referred to as "E/O converter" 204) and an "internal downlink optical signal O/E converter" 203. Then, electronic processing is performed to cancel and delete an electric signal received from the "internal downlink optical signal O/E converter" 203 (which may be simply referred to as "O/E converter" 203) by a signal transmitted by "internal uplink optical signal E/O converter" 204. In a case where the electronic processing can be performed without any problem, the above-described arrangement is effective to reduce the cost.

In FIG. 2, the internal downlink signal 2203 having a central wavelength of 980 nm, which is emitted from the optical signal separation distributor 24, is converted by the O/E converter 203 into an electric signal 2211. The electric signal 2211 is then supplied to the LD power source and optical transmission/reception control circuit 301. Further, control light driving power and an internal uplink signal to be supplied to the LD (not illustrated) provided in the "central wavelength 980 nm internal uplink optical signal E/O converter" 204 are transmitted as an electric signal 2212 from the LD power source and optical transmission/reception control circuit 301. The electric signal 2212 is transmitted as control light having a central wavelength of 980 nm and the internal uplink optical signal 2202. A laser diode (LD) power source of the LD power source and optical transmission/reception control circuit 301 is a control light source that can generate control light having a wavelength different from that of the signal light.

As illustrated in FIGS. 2 and 3, the LD power source and optical transmission/reception control circuit 301 of the representative subordinate optical communication adapter 111 is connected, via one of a plurality of (e.g., TCP/IP, USB, PCI, and PC card bus) interfaces 341 to 344 illustrated in FIG. 3, to any one of electric wirings 2111 to 2114 of electric signal connectors and a plurality of (e.g., TCP/IP, USB, PCI, and PC card bus) connectors 211 to 214 illustrated in FIG. 2. The electric signal connectors are connected to user side devices 221 (e.g., personal computer, digital terrestrial TV, AV recorder, game machine, etc., which correspond to the user side devices 160 illustrated in FIG. 1) via electric cables or electric circuits 2221 to 2224.

Among various interfaces, the PCI connection is dedicated to desktop type personal computers and the PC card bus connection is dedicated to notebook type personal computers. The PCI connection and the PC card bus connection are mutually exclusive. However, either one of the above-described two connections is combinable with TCP/IP and USB connections.

A power source adapter 220, a power source cable 2220, a power source connector 210, and a power source wiring 2110 illustrated in FIG. 2 can be omitted in a case where the subordinate optical communication adapter employs the PCI connection or the PC card bus connection. On the other hand, in a case where the power supply ability based on the USB connection is insufficient and/or in a case where the TCP/IP connection is employed, electric power supply via the route of the power source adapter 220, the power source cable 2220, the power source connector 210, and the power source wiring 2110 is essentially required for the LD power source and optical transmission/reception control circuit 301. Needless to say, it is useful to configure the above-described circuit arrangement in such a manner that electric power is consumed only when the user side devices 160 to 166 perform optical communications and no substantial "standby electric power" is generated when no optical communication is performed.

A prototype of the subordinate optical communication adapter 110 illustrated in FIG. 1 is comparable to or larger than a "lunch box" in size. However, it is expected that the subordinate optical communication adapter 110 can be effectively downsized to a level comparable to the PCI card or the notebook PC card by manufacturing optical components using fiber elements and integrating the components into a module, and further by using the LSI technology for the electronic circuits.

As illustrated in FIG. 3, communication control software can control various functions of the LD power source and optical transmission/reception control circuit 301, as described below.

The LD power source and optical transmission/reception control circuit 301 is in the following relationship with I/O circuits. A power source circuit 302 of the LD power source and optical transmission/reception control circuit 301 can receive electric power, if necessary, from an external power source via the power source wiring 2110 and the power source connector 210.

The following connection I/O circuits can be employed for the LD power source and optical transmission/reception control circuit 301, external or internal optical LAN, and the user side devices.

If a user of the user side devices 221 (e.g., personal computer, digital terrestrial TV, DVD recorder, game machine, etc.) illustrated at the bottom of FIG. 2 requests connection to the Internet via the station building side optical signal transmission/reception apparatus 1 (i.e., the host apparatus), a "request signal" is transmitted via any one of the electric circuits 2221 to 2224 to any one of the plurality of (e.g., TCP/IP, USB, PCI, and PC card bus) connectors 211 to 214 and then to anyone of the electric wirings 2111 to 2114. When the "request signal" arrives at an "in-house user side device uplink electric signal interface" 332 via any one of the plurality of interfaces 341 to 344 illustrated in FIG. 3, the "in-house user side device uplink electric signal interface" 332 generates, as illustrated in FIG. 3, an uplink signal 3324 to be transmitted to the station building side optical signal transmission/reception apparatus 1 (signal [1]) and an "optically controlled light switch control light emission request signal" 3325 to be used to transmit an uplink signal from an in-house user side device 160 to an external device (signal [2]). The uplink signal 3324 to be transmitted to the station building side optical signal transmission/reception apparatus 1 (signal [1]) and the optically controlled light switch control light emission request signal 3325 to be used to transmit an uplink signal from an in-house user side device 160 to an external device (signal [2]) are temporarily stored in a "central wavelength 1310 nm uplink optical signal transmission buffer" 322 and a "central wavelength 980 nm control light and internal uplink optical signal transmission buffer" 323, respectively.

FIG. 7 illustrates a relationship of time slots for the 1310 nm uplink signal and time slots allocated by the optical LAN control light. As illustrated in FIG. 7, the optical signal transmission timing of the "central wavelength 1310 nm uplink optical signal transmission buffer" 322 and the optical signal transmission timing of the "central wavelength 980 nm control light and internal uplink optical signal transmission buffer" 323 are controlled according to the following control procedure. The time slots (channel 0 to channel 6 illustrated in FIG. 7) for internal time division multiplexing communications, which can avoid any collision between internal uplink optical signals, are synchronized with the time slots (No. 01 and No. 02 illustrated in FIG. 7) for external time division multiplexing communications, which can avoid any collision between uplink signals to be transmitted from a plurality of users to the station building side optical signal transmission/reception apparatus 1.

First, in a case where the time slot channels 0 to 6 dedicated to the internal time division multiplexing communications are equal to each other in length as illustrated in FIG. 7 in which the time slot channels 0 to 6 are substantially overlapped with a time slot No. 01 dedicated to the external time division multiplexing communications, start and end times of these time slots can satisfy a relationship defined by the following inequality [1]. In the inequality [1], "Ts" represents a start time of the external time slot No. 01, and "Te" represents an end time of the external time slot No. 01. Further, "t0", "t2", "t4", "t6", "t8", "t10", and "t12" represent start times of seven time slots (channel 0 to channel 6 illustrated in FIG. 7) of the internal time division multiplexing communications, respectively. Moreover, "t1", "t3", "t5", "t7", "t9", "t11", and "t13" represent end times of the seven time slots (channel 0 to channel 6 illustrated in FIG. 7) of the internal time division multiplexing communications, respectively.

[Numerical Expression 1]

$$Ts<t0<t1<t2<t3<t4<t5<t6<t7<t8<t9<t10<t11<t12<t13<Te \quad [1]$$

The following formula [2] defines a "guard band Tg" to be provided for the start and end times of the plurality of time slots that satisfy the inequality [1]. Further, the following formula [3] defines a "time width tw" of seven time slots dedicated to the internal time division multiplexing communications.

[Numerical Expression 2]

$$Tg=t0-Ts=t2-t1=t4-t3=t6-t5=t8-t7=t10-t9=t12-t11=Te-t13 \quad [2]$$

[Numerical Expression 3]

$$tw=t1-t0=t3-t2=t5-t4=t7-t6=t9-t8=t11-t10=t13-t12 \quad [3]$$

In this case, a time width (Te−Ts) of one time slot dedicated to the external time division multiplexing communications (e.g., No. 01 illustrated in FIG. 7) is equal to 31.25 ms in a case where the number of users accessing the station building side optical signal transmission/reception apparatus 1 is 32. One time slot dedicated to the external time division multiplexing communications requires a total of eight guard bands Tg. If one guard band Tg is equal to 1.5 ms, a total time to be allocated to seven time slots dedicated to the internal time division multiplexing communications is 19.5 ms (=31.25−1.5×8). Therefore, the time width tw of each time slot dedicated to the internal time division multiplexing communications is equal to 2785.7 μs. In a case where the communication speed of the central wavelength 1310 nm uplink optical signal and the central wavelength 1490 nm downlink optical signal is 1 Gbit per second, one time slot dedicated to the internal time division multiplexing communications can be used to transmit and receive 2.79 Mbit information between one in-house user side device and the station building side optical signal transmission/reception apparatus 1.

The optically controlled optical path switching apparatus 100 performs the optical path switching within a time corresponding to the above-described guard band Tg (1.5 ms).

Next, in a case where time slot channels A, B, C, and any one of D to G dedicated to the internal time division multiplexing communications are unequal to others in length, as illustrated in FIG. 7 in which the time slot channels A, B, C, and any one of D to G are substantially overlapped with a time slot No. 02 dedicated to the external time division multiplexing communications, start and end times of these time slots can satisfy a relationship defined by the following inequality [4]. In the inequality [4], "Ts'" represents a start time of the external time slot No. 02, and "Te'" represents an end time of the external time slot No. 02. Further, "t14", "t16", "t18", and "t20" represent start times of four time slots (channels A, B, C, and any one of D to G illustrated in FIG. 7) of the unequal time length/internal time division multiplexing communications, respectively. Moreover, "t15", "t17", "t19", and "t21" represent end times of four time slots of the unequal time length/internal time division multiplexing communications, respectively.

[Numerical Expression 4]

$$Ts'<t14<t15<t16<t17<t18<t19<t20<t21<Te' \quad [4]$$

The following formula [5] defines a "guard band Tg'" to be provided for the start and end times of the plurality of time slots that satisfy the inequality [4]. Further, the following formulae [6] to [9] define "time widths twA, twB, twC, and twD to twG" of four time slots for the unequal time length/internal time division multiplexing communications.

[Numerical Expression 5]

$$Tg'=t14-Ts'=t16-t15=t18-t17=t20-t19=Te'-t21 \quad [5]$$

[Numerical Expression 6]

$$twA=t15-t14 \quad [6]$$

[Numerical Expression 7]

$$twB=t17-t16 \quad [7]$$

[Numerical Expression 8]

$$twC=t19-t18 \quad [8]$$

[Numerical Expression 9]

$$twD=twE=twF=twG=t21-t20 \quad [9]$$

In this case, a time width (Te'−Ts') of one time slot dedicated to the external time division multiplexing communications (e.g., No. 02 illustrated in FIG. 7) is equal to 31.25 ms in a case where the number of users accessing the station building side optical signal transmission/reception apparatus 1 is 32. Regarding four time slots dedicated to the unequal time length/internal time division multiplexing communications, which is substantially overlapped with the time slot No. 02 illustrated in FIG. 7, one time slot dedicated to the external time division multiplexing communications requires a total of five guard bands Tg'. If one guard band Tg' is equal to 1.5 ms, a total time to be allocated to four time slots dedicated to the unequal time length/internal time division multiplexing communications is 23.75 ms (=31.25−1.5×5). The time widths twA, teB, twC, and twD to twG of the time slots dedicated to the unequal time length/internal time division multiplexing communications are equal to 10.18, 6.79, 3.39, and 3.39 ms, respectively. In a case where the communication speed of the central wavelength 1310 nm uplink optical signal and the central wavelength 1490 nm downlink optical signal is 1 Gbit per second, respective time slots dedicated to the unequal time length/internal time division multiplexing communications can be used to transmit and receive 10.2, 6.8, 3.4, and 3.4 Mbit information, respectively, between one in-house user side device and the station building side optical signal transmission/reception apparatus 1.

In the present embodiment, four time slots dedicated to the unequal time length/internal time division multiplexing communications are allocated to the user side devices 160, respectively. For example, the longest time slot channel A is allocated to the "IP phone transmission/reception device." The second longest time slot channel B is allocated to a "computer (1)" that is most frequently used. The next time slot channel C is allocated to a "computer (2)" that is next frequently used. The time slot channels D to G dedicated to the unequal time length/internal time division multiplexing communications can be allocated to any one of four user side devices, for example, a "computer (3)" that is less frequently used, the "digital terrestrial TV (that receives a program table several times a day)", the "AV recorder (that receives a program table several times a day)", and the game machine. The time slot channels D to G can be successively allocated to any one of external time slots Nos. 02, 03, 04, and 05. More specifically, the time slot channels A, B, and C are usable to perform optical communications once per second. The time slot channels D, E, F, and G can be used to perform optical communication once per four seconds.

In the above-described embodiment, "the number of the time slots" dedicated to the "unequal time length/internal time division multiplexing communications" is four. However, the number of the time slots can be reduced to three or two in a case where a relatively long time is allocated to a time slot to be prioritized and when an optical circuit can be effectively used by reducing the frequency of optical communications to be performed by a user side device that is less frequently used. A "time slot setting utility software" incorporated in the LD power source and optical transmission/reception control circuit 301 can be used to perform the above-described adjustment of time to be allocated to respective time slots.

As illustrated in FIG. 3, first, the O/E converter 201 converts the central wavelength 1490 nm downlink optical signal received from the station building side optical signal transmission/reception apparatus 1 (i.e., the host apparatus) into the electric signal 2011. A "downlink signal decrypting apparatus (which can also serve as an uplink circuit time slot sync signal separator)" 311 separates the electric signal 2011 (i.e., the signal converted from the central wavelength 1490 nm downlink optical signal) into a "decrypted electric signal addressed to itself" 3111 and an "external sync signal" 3112 indicating transmission timing of the central wavelength 1310 nm uplink optical signal.

Further, a condition determination circuit 3030 that determines "whether the central wavelength 1490 nm downlink optical signal conversion electric signal is addressed to itself" separates the "decrypted electric signal" 3111 into a "decrypted electric signal addressed to itself" 3031 and an "electric signal addressed to another in-house user" 3032. An "interface dedicated to downlink electric signal supplied to in-house user side device" 331 sends the "decrypted electric signal addressed to itself" 3031 to the "TCP/IP interface" 341, the "USB interface" 342, the "PCI interface" 343, or the "PC card bus interface" 344. Then, the signal is guided via any one of the connectors 211 to 214 to the user side devices 221 (personal computer, digital terrestrial TV, DVD recorder, game machine, etc.) illustrated in FIG. 2.

The "electric signal addressed to another in-house user" 3032 is sent, without being discarded, to the "central wavelength 980 nm control light and internal uplink optical signal transmission buffer" 323 and is transferred to another in-house user at a transmission time slot.

The "external sync signal" 3112 indicating the transmission timing of the central wavelength 1310 nm uplink optical signal, which is separated by the "downlink signal decrypting apparatus (which can also serve as the uplink circuit time slot sync signal separator)" 311, is then transmitted to a "time slot sync signal transmission/reception device" 321. The "time slot sync signal transmission/reception device" 321 transmits transmission commands 3211 and 3210, which synchronize the time slots (e.g., the channels 0 to 6 or the channels A to G) dedicated to the internal time division multiplexing communication with the time slots (e.g., No. 01 and No. 02 illustrated in FIG. 7) dedicated to the external time division multiplexing communications, to the "central wavelength 1310 nm uplink optical signal transmission buffer" 322 and to the "central wavelength 980 nm control light and internal uplink optical signal transmission buffer" 323. The central wavelength 1310 nm uplink optical signal transmission buffer 322 sends the received transmission command 3211 to a condition determination circuit 3010 that determines "whether the optical path for the wavelength 1310 nm uplink optical signal is opened" based on an external sync signal 3110 "that notifies a time band (time slot) where the optical path for the wavelength 1310 nm uplink optical signal is opened." If it is determined that the optical path is opened, the condition determination circuit 3010 sends the electric signal 2012 to the wavelength 1310 nm uplink optical signal E/O converter (i.e., the laser diode) 202. If it is determined that the optical path is closed, the condition determination circuit 3010 sends a standby command 3012 to the wavelength 1310 nm uplink optical signal transmission buffer 322.

On the other hand, a condition determination circuit 3020 determines whether there is a "wavelength 980 nm optical signal addressed to another user" based on the electric signal 2211 received from the central wavelength 980 nm internal downlink signal O/E converter 203. If it is determined that the optical signal addressed to another user is present, the condition determination circuit 3020 sends a transmission signal 3021 to an internal time slot sync signal separator 312. The internal time slot sync signal separator 312 sends a separated internal time slot sync signal 3120 (e.g., channels 0 to 6 or channels A to G illustrated in FIG. 7) to the time slot sync signal transmission/reception device 321. If it is determined that there is no optical signal addressed to another user, the condition determination circuit 3020 sends a transmission permission command 3022 to the wavelength 980 nm control light and internal uplink optical signal transmission buffer 323. In this case, the timing of transmission is conformable with the transmission command 3210 sent from the time slot sync signal transmission/reception device 321. In response to reception of the transmission commands 3210 and 3022, the central wavelength 980 nm control light and internal uplink optical signal transmission buffer 323 sends the electric signal "control light control current and internal uplink signal" 2212 to the central wavelength 980 nm control light and internal uplink optical signal E/O converter (i.e., the laser diode) 204.

A condition determination circuit 3040 receives a central wavelength 980 nm downlink optical signal conversion electric signal 3121 from the internal time slot sync signal separator 312 and determines "whether the wavelength 980 nm downlink optical signal conversion electric signal is addressed to itself." If it is determined that the wavelength 980 nm downlink optical signal conversion electric signal is addressed to itself, the condition determination circuit 3040 sends a "downlink signal addressed to itself" 3041 to the "interface dedicated to downlink electric signal supplied to in-house user side device" 331. If it is determined that the wavelength 980 nm downlink optical signal conversion electric signal is not addressed to itself, the condition determination circuit 3040 discards a "signal not addressed to itself" 3042.

The above-described seven subordinate optical communication adapters 110 having highly-advanced optical communication functions (more specifically, external communications using the central wavelength 1310 nm uplink optical signal and the central wavelength 1490 nm downlink optical signal and internal bidirectional optical communications using the central wavelength 980 nm signal) uses the central wavelength 980 nm control light supplied to the optically controlled optical path switching apparatuses 100 as internal communication light that is usable in the optical LAN for the subordinate optical communication adapters, as illustrated in FIG. 1. To realize the above-described system, distributors 120 to 126 partly separate the control lights 1200 to 1206 at an intensity level of $1/10$ to $1/100$ (e.g., at an optical power from 0.1 mW to several mW). A multiplexer 130 multiplexes the separated control lights 1200 to 1206. A mirror 140, which is provided at an emission terminal of the bound optical path, reflects the multiplexed light. The distributors 120 to 126 can be constructed as a one-to-two fiber coupler type distributor that includes two single mode optical fibers whose cores are fused and integrated. Further, the multiplexer 130 can be constructed as a one-to-seven compatible fiber coupler that includes seven single mode optical fibers whose cores are fused and integrated. The stronger light having passed through the distributor 120 is guided to a beam stopper 135. The stronger lights having passed through the distributors 121 to 126, respectively, are output as the control lights 1211 to 1216 to be supplied to the peripheral cores 401 to 406 of the control light emission side seven-core optical fiber 440 (see FIG. 4) of the optically controlled optical path switching apparatus 100. The mirror 140 can be constructed as a total reflection film composed of dielectric multilayered films that can be provided at an emission end face of a bound optical path of the one-to-seven compatible fiber coupler type multiplexer 130. The dielectric multilayered film can include titanium oxide layers and silicon oxide layers that are alternately stacked one on top of another.

As illustrated in FIG. 5 of the patent literature 8 (JP 2000-121865 A), the mirror provided at the emission end face of the bound optical path of the fiber coupler type multiplexer 130 illustrated in FIG. 1 distributes a signal transmitted from any one of optical transmission/reception apparatuses (corresponding to the distributors 120 to 126 illustrated in FIG. 1) connected to the multiplexer 130 to the distributors 120 to 126 of all optical transmission/reception apparatuses including itself. More specifically, the above-described configuration can constitute a reflection-type star coupler based optical LAN.

The present invention has unique features in that not only the control light of the optically controlled optical path switching apparatus 100 illustrated in FIG. 1 is simply ON-OFF controlled, but also the intensity of the control light is appropriately modulated with the central wavelength 980 nm control light and internal uplink optical signal E/O converter 204 so that the control light can be used for bidirectional information transmissions in the reflection-type star coupler based optical LAN. To avoid any collision between central wavelength 980 nm control lights, it is confirmed whether there is any central wavelength 980 nm control light having been received from another user before transmitting its own control light. If there is not any central wavelength 980 nm control light received from another user, the control light for switching the optically controlled optical path switching apparatus 100 to its optical path is transmitted in a time slot allocated to itself. In this case, the control light also serves as communication light to be supplied to another user (e.g., a sync signal and a signal converted from the central wavelength 1490 nm downlink optical signal to the central wavelength 980 nm signal light). On the other hand, in a case where the central wavelength 980 nm control light emitted by another user is present, after receiving the sync signal and waiting for its own emission timing, a downlink signal from the outside addressed to itself is selectively received from a signal converted into the central wavelength 980 nm signal light. The above-described processing is useful in that the collision between the central wavelength 1310 nm uplink signal and the wavelength 980 nm control light can be avoided while the standby electric power can be reduced to substantially zero. Further, the above-described processing is useful to prevent the central wavelength 1490 nm downlink signal from being occupied by a specific user.

As described above, the present invention is capable of not only simply ON-OFF controlling the control light of the optically controlled optical path switching apparatus 100 illustrated in FIG. 1 but also appropriately modulating the intensity of the control light with the central wavelength 980 nm control light and internal uplink optical signal E/O converter 204, thereby using the control light for bidirectional information transmissions in the reflection-type star coupler based optical LAN. To this end, it is necessary to increase the output of a light source that generates the central wavelength 980 nm control light and internal uplink optical signal compared to a case where the control light is simply ON-OFF controlled. More specifically, in the present invention, the control lights 1201 to 1206 and 1211 to 1216 are ON-OFF modulated to transmit optical signals.

Therefore, the "control light power" required to drive a thermal lens type optically controlled light switch decreases to an approximately half level compared to the level required in a case where the "ON-OFF modulation is not performed." Accordingly, it is desired that an effective output of the laser diode incorporated in the central wavelength 980 nm control light and internal uplink optical signal E/O converter 204 is set to be approximately two times an effective output of the laser diode in a case where the ON-OFF modulation for outputting optical signals is not performed.

In FIG. 4, an arrow 4001 indicates a traveling direction of the control light in the optically controlled optical path switching apparatus 100. Control light 4010 or 4020 and signal light 4100 converge at a signal light transmitting/control light absorbing layer 40 of a thermal lens forming element 47 or its vicinity, in such a manner that convergence points of the control light 4010 or 4020 and the signal light 4200 are mutually deviated in the vertical direction relative to optical axis. The wavelength of the control light 4010 or the control light 4020 is selected from a wavelength band that can be absorbed by the signal light transmitting/control light absorbing layer 40. The wavelength of the signal light 4200 is selected from a wavelength band that cannot be absorbed by the signal light transmitting/control light absorbing layer 40. The control light 4010 or the control light 4020 and the signal light 4200 converge at the signal light transmitting/control light absorbing layer 40 or its vicinity, respectively. The temperature of the signal light transmitting/control light absorbing layer 40 increases locally in an area where the control light is absorbed and its peripheral area, depending on the presence of emission of one or more control lights (the control light 4010, the control light 4020, etc.) and according to the irradiation intensity of each light. The above-described increase in temperature substantially changes the refractive index of the signal light transmitting/control light absorbing layer 40. The traveling direction of the signal light changes according to the change in refractive index. The signal light 4201 or the signal light 4202, after its traveling direction is changed, enters one of light-receiving side optical fiber cores 420 to 426 according to an optical path switching request.

In FIG. 4, it is desired that the signal light transmitting/control light absorbing layer 40 of the thermal lens forming element 47 has spectral transmission characteristics capable of losslessly transmitting the central wavelength 1310 nm uplink optical signal and the central wavelength 1490 nm downlink optical signal and also capable of losslessly absorbing the central wavelength 980 nm control light. For example, an appropriate pigment solution can be preferably used as the signal light transmitting/control light absorbing layer 40 of the thermal lens forming element 47. The pigment solution is a solution of an organic solvent having a higher boiling point and a lower viscosity, which contains a dissolved organic pigment that has absorbency characteristics maximized at the wavelength of 980 nm or its vicinity and does not absorb the light in a wavelength range from 1300 nm to 1600 nm. A quartz glass plate having a thickness of 0.5 mm can be used, for example, to constitute a portion other than the signal light transmitting/control light absorbing layer 40 of the thermal lens forming element 47. The shape of the signal light transmitting/control light absorbing layer 40 of the thermal lens forming element 47 is, for example, a low-height columnar shape having a height of 0.2 mm to 0.5 mm and a diameter of 3 mm to 8 mm. The signal light transmitting/control light absorbing layer 40 is disposed in such a manner that an incident direction of the signal light 1011 is vertical to a bottom surface of the columnar body.

For example, YKR-3081 manufactured by Yamamoto Chemicals Inc. is a pigment that is easily soluble in an aromatic series organic solvent and has absorbency characteristics maximized at the wavelength of 980 nm or its vicinity and does not absorb the light in the wavelength range from 1300 nm to 1600 nm. It is recommendable to use a mixed solvent containing the following four structural isomer components (identical in molecular weight) as the organic solvent that dissolves the above-described pigment. The mixing ratio of respective components can be arbitrarily set in a range from 5% to 50%.

First component: 1-phenyl-1-(2,5-xylyl)ethane
Second component: 1-phenyl-1-(2,4-xylyl)ethane
Third component: 1-phenyl-1-(3,4-xylyl)ethane
Fourth component: 1-phenyl-1-(4-ethyl phenyl)ethane The optical fiber or the optical waveguide used in the present invention is required to have single mode characteristics capable of losslessly transmitting light having a central wavelength in a range from 980 nm to 1600 nm. The signal light optical paths 1110 to 1116 are connected via the optical connectors 21 and 22 to the control light optical paths 1200 to 1206, respectively, in seven subordinate optical communication adapters 110. However, optical fibers having other standards can be used to configure the signal light optical paths and the control light optical paths considering the above-described transmission characteristics. Further, to prevent any error in connection, it is recommendable that the optical connector 21 dedicated to the signal light and the optical connector 22 dedicated to the control light are differentiated from each other in shape. Further, it is not easy for general users in individual homes to process or fabricate the connector to be used for a single mode optical fiber. Therefore, it is desired to provide appropriate "optical LAN cables (equipped with optical connectors)" including signal light fibers and control light fibers that are integrally bound, as standardized products of, for example, 1 m, 2 m, 3 m, 4 m, 5 m, 7 m, 10 m, 15 m, 20 m, 25 m, 30 m, 40 m, and 50 m, which are regulated in length.

As understood from FIGS. 1 and 6, the uppermost subordinate optical communication adapter 110 illustrated in FIG. 1 is connected to the signal light optical path 1110 that is connected to the "central core" 420 into which the signal light enters straight. All control lights from the subordinate optical communication adapters are not emitted to the "central core" 420. The uppermost subordinate optical communication adapter 110 is specific in function as well as in specification. More specifically, in the aspect of function, the uppermost subordinate optical communication adapter 110 illustrated in FIG. 1 is required to "respond to an incoming call from an IP phone while consuming substantially no standby electric power." In other words, the subordinate optical communication adapter to which the IP phone transmission/reception device is connected as a user side device is required to be connected to an optical path into which all of the control lights are not emitted and the signal light enters straight. To reduce the standby electric power of the IP phone transmission/reception device to substantially zero, it is useful to provide an electric circuit that is triggered by an electric signal to be generated by a photodiode in the O/E converter of the uppermost subordinate optical communication adapter 110 illustrated in FIG. 1 in response to an incoming call optical signal. In this case, an initial incoming call optical signal is used to activate the electric circuit. The content of the initial incoming call signal can be known by decoding a re-transmitted optical signal in the procedure of "incoming call failure retransmission" to be performed by a transmission side. The above-described "optical wake-up optical LAN function" is not limited to the uppermost subordinate optical communication adapter 110 illustrated in FIG. 1. The rest of the subordinate optical communication adapters 110 illustrated in FIG. 1, i.e., a total of six (i.e., the second highest and subsequent) subordinate optical communication adapters 110, can possess a similar function. In this case, all the subordinate optical communication adapters can be unified in their specifications.

On the other hand, in the aspect of specification, the uppermost subordinate optical communication adapter 110 illustrated in FIG. 1, into which all of the control lights are not emitted and the signal light enters straight, is different from another (i.e., a total of six (the second highest and subsequent)) subordinate optical communication adapters 110 illustrated in FIG. 1 in the following points.

[1] The control light 1200 from the uppermost subordinate optical communication adapter 110 illustrated in FIG. 1 is distributed by the distributor 120 as a beam 1210, which is not required to be connected to the optically controlled optical path switching apparatus 100. Only the control light 1220 to be connected to the reflection-type star coupler based optical LAN is required.

Figure 9:
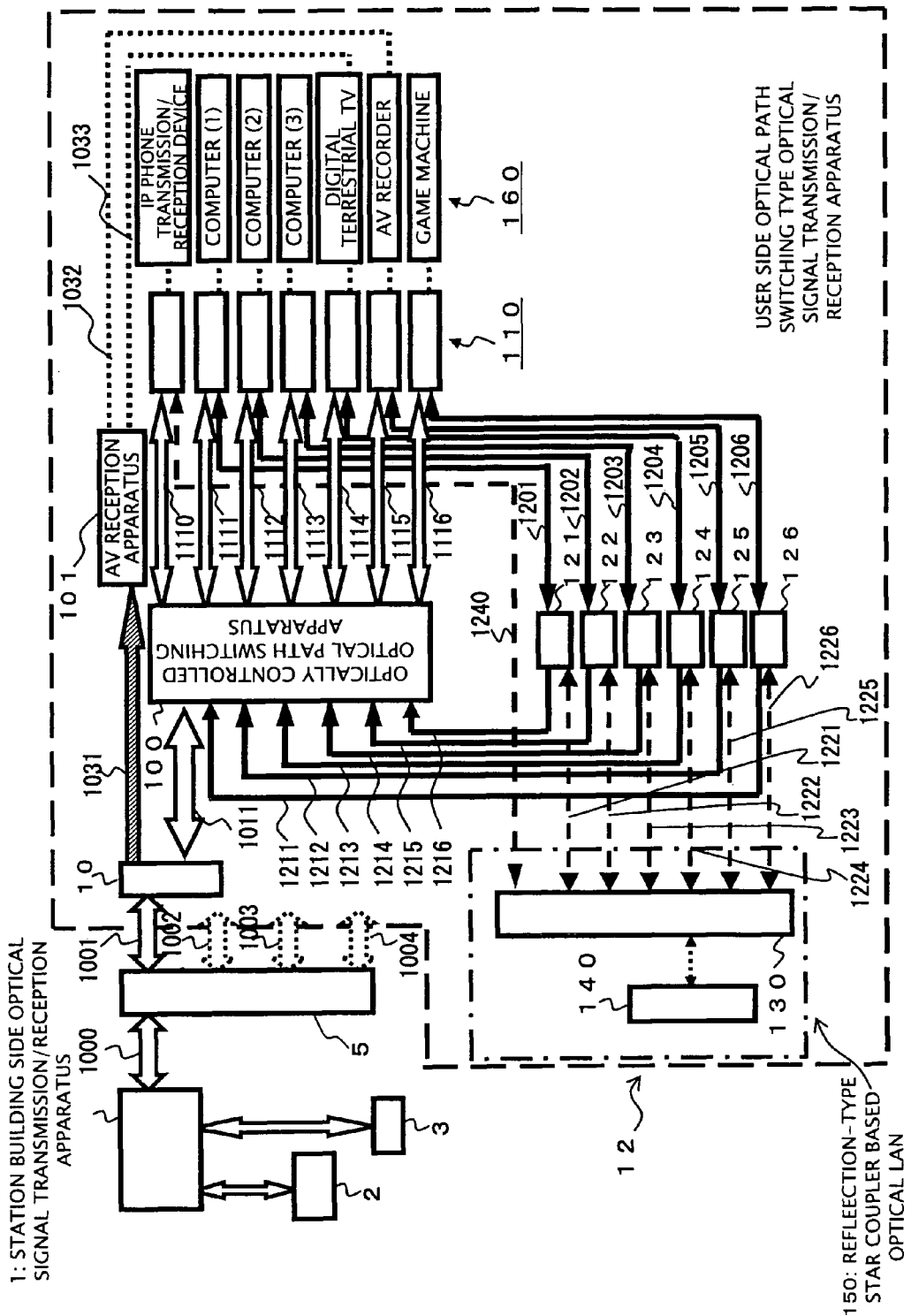
FIG. 9 is a block diagram illustrating a configuration of an optical path switching type optical signal transmission/reception apparatus according to a second embodiment of the present invention.

[2] As illustrated in FIG. 9, a second embodiment provides no distributor that receives the control light 1200 from the uppermost subordinate optical communication adapter 110. More specifically, the system configuration illustrated in FIG. 9 does not include the distributor 120 illustrated in FIG. 1. In this case, it is necessary to adjust the transmission power of the control light 1200 to be emitted from the uppermost subordinate optical communication adapter 110 illustrated in FIG. 9 to a $1/10$ to $1/100$ level compared to the transmission power of the control light to be emitted from another (i.e., a total of six (second highest and subsequent)) subordinate optical communication adapters 110 illustrated in FIG. 9, so as to be equivalent to the one branched by the distributor 121 in intensity. Thus, a subordinate optical communication adapter having a special specification is included in one set of a plurality of (e.g., seven at maximum) subordinate optical communication adapters. In particular, in a case where the IP phone transmission/reception device is not used as one of the user side devices 160, it is advantageous that seven subordinate optical communication adapters 110 have the same specifications to enhance their compatibility.

[3] As illustrated in FIG. 1, according to the configuration employed in the first embodiment, the beam 1210 is distributed by the distributor 120 and connected to the beam stopper 135. Therefore, the uppermost subordinate optical communication adapter 110 illustrated in FIG. 1 and another (i.e., a total of six (the second highest and subsequent)) subordinate optical communication adapters 110 illustrated in FIG. 1 can be unified in their specifications. According to the above-described configuration, if the IP phone transmission/reception device is not used as one of the user side devices 160, it is not unnecessary to differentiate the specifications of seven subordinate optical communication adapters 110. An arbitrary subordinate optical communication adapter 110 can be connected to an arbitrary port of the optically controlled optical path switching apparatus 100.

In a case where the user side optical path switching type optical signal transmission/reception apparatus 11 to be connected to the reflection-type star coupler based optical LAN according to the first embodiment is initially set, and in a case where the total number of the subordinate optical communication adapters 110 is six or less in an initial state and is later increased to the maximum (=7), it is useful to mutually inform identification codes of respective subordinate optical communication adapters and execute processing according to an "initial setting procedure" stored in a nonvolatile memory (not illustrated) mounted on the LD power source and optical transmission/reception control circuit 301. More specifically, for example, it is useful to supply electric power only to the second highest subordinate optical communication adapter 110 illustrated in FIG. 1 and the second highest user side device 160 illustrated in FIG. 1 (i.e., computer (1)), and then activate the software of the "initial setting procedure." Further, it is useful to activate the uppermost subordinate optical communication adapter 110 illustrated in FIG. 1 and the remaining five (i.e., the third highest and subsequent) subordinate optical communication adapters 110 illustrated in FIG. 1 and turn on the power sources of the uppermost user side device 160 illustrated in FIG. 1 and the remaining five (i.e., the third highest and subsequent) user side devices 160 illustrated in FIG. 1, according to instructions of the software. Meanwhile, identification codes of respective subordinate optical communication adapters, are mutually informed.

[Second Embodiment]

An optical path switching type optical signal transmission/reception apparatus according to a second embodiment of the present invention is described below with reference to FIG. 9.

The second embodiment is similar to the above-described first embodiment except for constituent components described below. Therefore, constituent components similar to those described in the first embodiment are denoted by the same reference numerals and their detailed descriptions are not repeated.

(a) The uppermost subordinate optical communication adapter 110 illustrated in FIG. 9 receives signal light that travels straight when no control light is emitted. The uppermost subordinate optical communication adapter 110 is exclusively used for the IP phone transmission/reception device that serves as one of the user side devices 160. More specifically, the uppermost subordinate optical communication adapter 110 has the above-described "optical wake-up optical LAN function" that is installed to respond to an incoming call from an IP phone. Therefore, the uppermost subordinate optical communication adapter 110 transmits control light 1240 having an optical power comparable to that of the light attenuated to a $1/10$ to $1/100$ level by a distributor, without providing the distributor 120 on the optical path of the control.

(b) The distributor 120 and the beam stopper 135, which are illustrated in FIG. 1 according to the first embodiment, are not provided on the optical path 1240 of the control light from the uppermost subordinate optical communication adapter 110 illustrated in FIG. 9.

(c) The optical path 1240 of the control light from the uppermost subordinate optical communication adapter 110 illustrated in FIG. 9 is directly connected to the multiplexer 130.

The second embodiment is similar to the first embodiment except for the above-described features (a) and (c).

While the present invention has been described with reference to exemplary embodiments, it is to be understood that the present invention is not limited to the disclosed exemplary embodiments. Further, this application claims priority from Japanese Patent Application No. 2009-099526 filed Apr. 16, 2009, which is hereby incorporated by reference herein in its entirety.

INDUSTRIAL APPLICABILITY

The optical path switching type optical signal transmission/reception apparatus using a thermal lens type optically controlled optical path switching switch and the relevant optical signal transmission/reception method according to the present invention can be used, for example, in an optical signal transmission/reception system associated with a data transmission station that performs communication services (e.g., IP phone, Internet communication, wire broadcasting, etc.) via an optical fiber. The optical path switching type optical signal transmission/reception apparatus and the optical signal transmission/reception method according to the present invention can be preferably used in a power saving type optical information transmission system, which can minimize the standby electric power in a user side device and can bring an optical path connected to the optical path switching type optical signal transmission/reception apparatus into an operating state only when each user performs data optical transmission/reception, and further enables a plurality of users to simultaneously use the system.

The invention claimed is:

1. An optical path switching type optical signal transmission/reception apparatus comprising:
    a host optical signal transmission/reception apparatus;
    a one-to-N compatible optically controlled optical path switching apparatus connected to the host optical signal transmission/reception apparatus via a first optical path constructed by an optical fiber or an optical waveguide;
    a total of N subordinate optical communication adapters connected to the one-to-N compatible optically controlled optical path switching apparatus via second optical paths constructed by an optical fiber or an optical waveguide and configured to transmit and receive signal light to and from the one-to-N compatible optically controlled optical path switching apparatus via the second optical paths;
    user side devices connected to the total of N subordinate optical communication adapters via an electric circuit;
    an optical transmission/reception control circuit provided in each of the total of N subordinate optical communication adapters, and including at least an uplink optical signal transmission mechanism, a downlink optical signal reception mechanism, and a control light source that can generate control light to drive the one-to-N compatible optically controlled optical path switching apparatus, in which a wavelength of the generated control light is different from a wavelength of the signal light;
    third optical paths dedicated to the control light and constructed by an optical fiber or an optical waveguide to connect the one-to-N compatible optically controlled optical path switching apparatus and the total of N subordinate optical communication adapters; and
    a subordinate data transmission/reception inter-apparatus bidirectional communication unit configured to transmit, to another subordinate optical communication adapter, information indicating a state where the control light is transmitted from the optical transmission/reception control circuit of one subordinate optical communication adapter, in which the control light serves to open one of the second optical paths that connects the one subordinate optical communication adapter to the host optical signal transmission/reception apparatus, and further configured to prevent any conflict of control lights,
    wherein the numerical value N is an integer that is equal to or greater than 2.

2. The optical path switching type optical signal transmission/reception apparatus according to claim 1, wherein the subordinate data transmission/reception inter-apparatus bidirectional communication unit is constructed as a reflection-type star coupler based optical LAN that includes:
    an optical communication oriented transmission/reception mechanism provided in each of the total of N subordinate optical communication adapters and using the wavelength of the control light supplied from the control light source;
    a plurality of distributors provided on respective optical paths, which are constructed by an optical fiber or an optical waveguide to transmit the control light that connects the one-to-N compatible optically controlled optical path switching apparatus to the total of N subordinate optical communication adapters;
    a multiplexer that binds a total of N fourth optical paths, which extend from respective distributors and are constructed by an optical fiber or an optical waveguide, and
    a mirror provided at a bound output terminal of the multiplexer.

3. The optical path switching type optical signal transmission/reception apparatus according to claim 2, wherein in a case where the numerical value N is 7, a one-to-seven compatible thermal lens type optically controlled optical path switching apparatus is used to switch an optical path of signal light to be emitted from a central fiber of an end face closely-arranged seven-core optical fiber to one of seven directions by using control light that can be emitted from any one of six optical fibers provided around the central fiber.

4. The optical path switching type optical signal transmission/reception apparatus according to claim 2, wherein
    uplink signal light transmitted from the one-to-N compatible optically controlled optical path switching apparatus to the host optical signal transmission/reception apparatus is light having a wavelength in a range from 1260 nm to 1360 nm,
    downlink signal light transmitted from the host optical signal transmission/reception apparatus to the one-to-N compatible optically controlled optical path switching apparatus is light having a wavelength in a range from 1480 nm to 1500 nm, and
    the control light is light having a wavelength in a range from 980 nm to 1250 nm.

5. The optical path switching type optical signal transmission/reception apparatus according to claim 2, wherein no distributor is provided on the third optical path of the control light from a subordinate optical communication adapter connected to a second optical path to which the signal light is emitted in a case where no control light is emitted to the one-to-N compatible optically controlled optical path switching apparatus, and the control light from the subordinate optical communication adapter is directly connected to the reflection-type star coupler.

6. The optical path switching type optical signal transmission/reception apparatus according to claim 3, wherein the one-to-seven compatible optically controlled optical path switching apparatus includes a thermal lens forming element having a signal light transmitting/control light absorbing layer, and a control light emission side optical path and a signal light receiving side optical path are seven-core optical fibers.

7. The optical path switching type optical signal transmission/reception apparatus according to claim 6, wherein
    uplink signal light transmitted from the one-to-seven compatible optically controlled optical path switching apparatus to the host optical signal transmission/reception apparatus is light having a wavelength in a range from 1260 nm to 1360 nm,
    downlink signal light transmitted from the host optical signal transmission/reception apparatus to the one-to-seven compatible optically controlled optical path switching apparatus is light having a wavelength in a range from 1480 nm to 1500 nm, and
    the control light is light having a wavelength in a range from 980 nm to 1250 nm.

8. The optical path switching type optical signal transmission/reception apparatus according to claim 6, wherein no distributor is provided on the third optical path of the control light from a subordinate optical communication adapter connected to a second optical path to which the signal light is emitted in a case where no control light is emitted to the one-to-N compatible optically controlled optical path switching apparatus or the one-to-seven compatible optically controlled optical path switching apparatus, and the control light from the subordinate optical communication adapter is directly connected to the reflection-type star coupler.

9. The optical path switching type optical signal transmission/reception apparatus according to claim 3, wherein
uplink signal light transmitted from the one-to-seven compatible optically controlled optical path switching apparatus to the host optical signal transmission/reception apparatus is light having a wavelength in a range from 1260 nm to 1360 nm,
downlink signal light transmitted from the host optical signal transmission/reception apparatus to the one-to-seven compatible optically controlled optical path switching apparatus is light having a wavelength in a range from 1480 nm to 1500 nm, and
the control light is light having a wavelength in a range from 980 nm to 1250 nm.

10. The optical path switching type optical signal transmission/reception apparatus according to claim 3, wherein no distributor is provided on the third optical path of the control light from a subordinate optical communication adapter connected to a second optical path to which the signal light is emitted in a case where no control light is emitted to the one-to-N compatible optically controlled optical path switching apparatus or the one-to-seven compatible optically controlled optical path switching apparatus, and the control light from the subordinate optical communication adapter is directly connected to the reflection-type star coupler.

11. The optical path switching type optical signal transmission/reception apparatus according to claim 1, wherein in a case where the numerical value N is 7, a one-to-seven compatible thermal lens type optically controlled optical path switching apparatus is used to switch an optical path of signal light to be emitted from a central fiber of an end face closely-arranged seven-core optical fiber to one of seven directions by using control light that can be emitted from any one of six optical fibers provided around the central fiber.

12. The optical path switching type optical signal transmission/reception apparatus according to claim 11, wherein the one-to-seven compatible optically controlled optical path switching apparatus includes a thermal lens forming element having a signal light transmitting/control light absorbing layer, and a control light emission side optical path and a signal light receiving side optical path are seven-core optical fibers.

13. The optical path switching type optical signal transmission/reception apparatus according to claim 12, wherein
uplink signal light transmitted from the one-to-seven compatible optically controlled optical path switching apparatus to the host optical signal transmission/reception apparatus is light having a wavelength in a range from 1260 nm to 1360 nm,
downlink signal light transmitted from the host optical signal transmission/reception apparatus to the one-to-seven compatible optically controlled optical path switching apparatus is light having a wavelength in a range from 1480 nm to 1500 nm, and
the control light is light having a wavelength in a range from 980 nm to 1250 nm.

14. The optical path switching type optical signal transmission/reception apparatus according to claim 12, wherein no distributor is provided on the third optical path of the control light from a subordinate optical communication adapter connected to a second optical path to which the signal light is emitted in a case where no control light is emitted to the one-to-N compatible optically controlled optical path switching apparatus or the one-to-seven compatible optically controlled optical path switching apparatus, and the control light from the subordinate optical communication adapter is directly connected to the reflection-type star coupler.

15. The optical path switching type optical signal transmission/reception apparatus according to claim 11, wherein
uplink signal light transmitted from the one-to-seven compatible optically controlled optical path switching apparatus to the host optical signal transmission/reception apparatus is light having a wavelength in a range from 1260 nm to 1360 nm,
downlink signal light transmitted from the host optical signal transmission/reception apparatus to the one-to-seven compatible optically controlled optical path switching apparatus is light having a wavelength in a range from 1480 nm to 1500 nm, and
the control light is light having a wavelength in a range from 980nm to 1250 nm.

16. The optical path switching type optical signal transmission/reception apparatus according to claim 11, wherein no distributor is provided on the third optical path of the control light from a subordinate optical communication adapter connected to a second optical path to which the signal light is emitted in a case where no control light is emitted to the one-to-N compatible optically controlled optical path switching apparatus or the one-to-seven compatible optically controlled optical path switching apparatus, and the control light from the subordinate optical communication adapter is directly connected to the reflection-type star coupler.

17. The optical path switching type optical signal transmission/reception apparatus according to claim 1, wherein
uplink signal light transmitted from the one-to-N compatible optically controlled optical path switching apparatus to the host optical signal transmission/reception apparatus is light having a wavelength in a range from 1260 nm to 1360 nm,
downlink signal light transmitted from the host optical signal transmission/reception apparatus to the one-to-N compatible optically controlled optical path switching apparatus is light having a wavelength in a range from 1480 nm to 1500 nm, and
the control light is light having a wavelength in a range from 980 nm to 1250 nm.

18. The optical path switching type optical signal transmission/reception apparatus according to claim 17, wherein no distributor is provided on the third optical path of the control light from a subordinate optical communication adapter connected to a second optical path to which the signal light is emitted in a case where no control light is emitted to the one-to-N compatible optically controlled optical path switching apparatus, and the control light from the subordinate optical communication adapter is directly connected to the reflection-type star coupler.

19. An apparatus including a combination of an optically controlled optical path switching type optical signal transmission/reception apparatus and a reflection-type star coupler based bidirectional optical communication apparatus that uses a part of control light to drive the optically controlled optical path switching apparatus, comprising:
a host optical signal transmission/reception apparatus;
a one-to-seven compatible optically controlled optical path switching apparatus connected to the host optical signal transmission/reception apparatus via a first optical path constructed by an optical fiber or an optical waveguide;
a total of seven subordinate optical communication adapters connected to the one-to-seven compatible optically controlled optical path switching apparatus via second optical paths constructed by an optical fiber or an optical waveguide and configured to transmit and receive signal light to and from the one-to-seven compatible optically controlled optical path switching apparatus via the second optical paths;

user side devices connected to the total of seven subordinate optical communication adapters via an electric circuit;

an optical transmission/reception control circuit provided in each of the total of seven subordinate user side optical communication adapters, and including at least an uplink optical signal transmission mechanism, a downlink optical signal reception mechanism, a control light source that can generate control light to drive the one-to-seven compatible optically controlled optical path switching apparatus, in which a wavelength of the generated control light is different from a wavelength of the signal light, and an optical communication oriented transmission/reception mechanism using the wavelength of the control light source;

third optical paths dedicated to the control light and constructed by an optical fiber or an optical waveguide to connect the one-to-seven compatible optically controlled optical path switching apparatus and the total of seven subordinate user side optical communication adapters;

a plurality of distributors provided on respective third optical paths dedicated to the control light; and a reflection-type star coupler including a multiplexer that binds fourth optical paths extending from respective distributors and constructed by an optical fiber or an optical waveguide, and a mirror provided at a bound emission terminal of the multiplexer.

20. The optical path switching type optical signal transmission/reception apparatus according to claim 19, wherein no distributor is provided on the third optical path of the control light from a subordinate optical communication adapter connected to a second optical path to which the signal light is emitted in a case where no control light is emitted to the one-to-seven compatible optically controlled optical path switching apparatus, and the control light from the subordinate optical communication adapter is directly connected to the reflection-type star coupler.

21. An optical signal transmission/reception method combining a method for optically controlling switching of an optical path of signal light to one of a total of N (N being an integer equal to or greater than 2) different directions using control light, wherein a wavelength of the signal light is different from a wavelength of the control signal and the signal light has at least one type of wavelength, and a method for performing bidirectional optical communication with the wavelength of the control light by superposing an optical communication signal on the control light, partly distributing the signal light, multiplexing the distributed signal light, and then reflecting the multiplexed signal light with a mirror, wherein, when a subordinate optical communication adapter connected to a user side device requests optical communication to be performed via the host optical signal transmission/reception apparatus, the subordinate optical communication adapter performs:

monitoring a communication status of another user in a reflection-type star coupler based optical LAN;

performing synchronization processing for time division multiplexing transmission/reception;

further, checking a time slot for time division multiplexing to transmit an uplink signal to the host optical signal transmission/reception apparatus;

driving a control light source mounted on the subordinate optical communication adapter according to the time slot allocated to itself for time division multiplexing;

performing an optical path switching operation to connect an optical path of itself to an optically controlled optical path switching apparatus that switches the optical path of the signal light having at least one type of wavelength different from that of the control light to one of a total of N different directions;

transmitting a sync signal to another subordinate optical communication adapter;

transmitting the uplink signal to the host optical signal transmission/reception apparatus, together with an identification code given to the uplink signal for a corresponding returning/downlink signal; and meanwhile, receiving a downlink signal from the host optical signal transmission/reception apparatus, deciphering the received downlink signal, determining a user house addressing signal and an identification code of an in-house user side device, transmitting a signal addressed to itself to a user side device connected to itself, and distributing a signal addressed to another in-house user side device, via a control light source, to a corresponding user side device connected to the reflection-type star coupler based optical LAN.

* * * * *